United States Patent
Furusawa et al.

(10) Patent No.: US 10,020,098 B2
(45) Date of Patent: Jul. 10, 2018

(54) PRODUCTION METHOD FOR PERMANENT MAGNET, AND PRODUCTION DEVICE FOR PERMANENT MAGNET

(71) Applicant: Mitsubishi Electric Corporation, Chiyoda-ku (JP)

(72) Inventors: Kimiyasu Furusawa, Chiyoda-ku (JP); Yoshikazu Ugai, Chiyoda-ku (JP); Hiroyuki Akita, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 690 days.

(21) Appl. No.: 14/414,729

(22) PCT Filed: Sep. 5, 2013

(86) PCT No.: PCT/JP2013/073867
§ 371 (c)(1),
(2) Date: Jan. 14, 2015

(87) PCT Pub. No.: WO2014/038607
PCT Pub. Date: Mar. 13, 2014

(65) Prior Publication Data
US 2015/0179320 A1 Jun. 25, 2015

(30) Foreign Application Priority Data

Sep. 6, 2012 (JP) .................................. 2012-196002
Sep. 21, 2012 (JP) .................................. 2012-207885

(51) Int. Cl.
*B22F 3/02* (2006.01)
*B22F 3/03* (2006.01)
(Continued)

(52) U.S. Cl.
CPC ............ *H01F 1/0536* (2013.01); *B22F 3/003* (2013.01); *B22F 3/004* (2013.01); *B22F 3/02* (2013.01);
(Continued)

(58) Field of Classification Search
CPC ... H02K 1/02; H02K 1/27; H02K 1/278; H02K 15/03; B22F 3/003; B22F 3/004;
(Continued)

(56) References Cited

U.S. PATENT DOCUMENTS 3,373,003 A * 3/1968 Schreiner .................. B22F 7/06
200/268
5,405,455 A 4/1995 Kusunoki et al.
(Continued)

FOREIGN PATENT DOCUMENTS

JP 60-219947 A 11/1985
JP 5-021218 A 1/1993
(Continued)

OTHER PUBLICATIONS

Ukai et al., Machine Translation of JP2003236699, Aug. 2003.*
(Continued)

*Primary Examiner* — Quyen Leung
*Assistant Examiner* — Eric Johnson
(74) *Attorney, Agent, or Firm* — Buchanan Ingersoll & Rooney PC

(57) ABSTRACT

In a production method for permanent magnet, a magnetic powder is loaded into a cavity formed in a groove shape whose longitudinal direction horizontally extends. A loading step of loading the magnetic powder includes a first loading step of loading, of the magnetic powder, a first magnetic powder containing no heavy rare earth element or containing a heavy rare earth element, and a second loading step of loading, of the magnetic powder, a second magnetic powder (Continued)

having a higher content rate of heavy rare earth element than that of the first magnetic powder, at a predetermined position in the cavity.

12 Claims, 21 Drawing Sheets

(51) Int. Cl.
    *B22F 3/12*     (2006.01)
    *B22F 5/00*     (2006.01)
    *B22F 7/00*     (2006.01)
    *B22F 7/02*     (2006.01)
    *H01F 7/02*     (2006.01)
    *H01F 41/02*     (2006.01)
    *H02K 1/02*     (2006.01)
    *H02K 1/27*     (2006.01)
    *H01F 1/053*     (2006.01)
    *H02K 15/03*     (2006.01)
    *C22C 38/00*     (2006.01)
    *B22F 3/00*     (2006.01)
    *B30B 11/02*     (2006.01)
    *B30B 15/30*     (2006.01)

(52) U.S. Cl.
    CPC .................. *B22F 3/03* (2013.01); *B22F 3/12* (2013.01); *B22F 5/00* (2013.01); *B22F 7/008* (2013.01); *B22F 7/02* (2013.01); *B30B 11/025* (2013.01); *B30B 15/302* (2013.01); *C22C 38/002* (2013.01); *C22C 38/005* (2013.01); *H01F 7/02* (2013.01); *H01F 41/0266* (2013.01); *H01F 41/0273* (2013.01); *H01F 41/0293* (2013.01); *H02K 1/02* (2013.01); *H02K 1/27* (2013.01); *H02K 1/278* (2013.01); *H02K 15/03* (2013.01)

(58) Field of Classification Search
    CPC ...... B22F 3/02; B22F 3/03; B22F 3/12; B22F 7/008; B22F 7/02; B22F 5/00; B30B 11/02; B30B 15/302; H01F 7/02; H01F 41/0266; H01F 41/0273; H01F 41/0293; C22C 38/002; C22C 38/005
    USPC .................................. 148/108, 301; 419/6, 38
    See application file for complete search history.

(56) References Cited

U.S. PATENT DOCUMENTS

| | | | |
|---|---|---|---|
| 2001/0031216 A1* | 10/2001 | Kohara | ..................... B22F 3/03 419/66 |
| 2005/0208164 A1 | 9/2005 | Ugai et al. | |
| 2010/0007232 A1 | 1/2010 | Komuro et al. | |
| 2010/0034688 A1 | 2/2010 | Nagata et al. | |
| 2010/0109468 A1* | 5/2010 | Natsumeda | .............. H02K 1/02 310/156.43 |
| 2012/0080972 A1* | 4/2012 | Kanada | ................... H01F 1/086 310/156.43 |
| 2013/0169098 A1* | 7/2013 | Chamberlin | ........... H02K 1/272 310/156.08 |

FOREIGN PATENT DOCUMENTS

| | | | |
|---|---|---|---|
| JP | 11355985 A | * | 12/1999 |
| JP | 2003236699 A | * | 8/2003 |
| JP | 2006-207002 A | | 8/2006 |
| JP | 2007-123323 A | | 5/2007 |
| JP | 2009-027847 A | | 2/2009 |
| JP | 2009027847 A | * | 2/2009 |
| JP | 2010-022147 A | | 1/2010 |
| JP | 2010-98080 A | | 4/2010 |
| JP | 2011-019401 A | | 1/2011 |
| JP | 2011-216711 A | | 10/2011 |
| JP | 2011-216836 A | | 10/2011 |
| JP | 2011-229329 A | | 11/2011 |
| WO | WO 2008/062757 A1 | | 5/2008 |

OTHER PUBLICATIONS

Kobayashi et al., Machine Translation of JP2010098080, Apr. 2010.*
Shimomura et al., Machine Translation of JP11355985, Dec. 1999.*
Yabumi et al., Machine Translation of JP2009027847, Feb. 2009.*
Sinter Definition, American Heritage Dictionary of English Language, 5th Ed., 2016.*
International Search Report (PCT/ISA/210) dated Dec. 10, 2013, by the Japanese Patent Office as the International Searching Authority for International Application No. PCT/JP2013/073867.

* cited by examiner (a)

(b)

(a)

(b)

(a)

223a (b)

223b

PRODUCTION METHOD FOR PERMANENT MAGNET, AND PRODUCTION DEVICE FOR PERMANENT MAGNET

TECHNICAL FIELD

The present invention relates to a production method for permanent magnet, a production device for permanent magnet, a permanent magnet and a rotating electrical device, the permanent magnet being produced using a plurality of magnetic materials or a plurality of permanent magnet materials having different compositions.

BACKGROUND ART

A rare earth sintered magnet is known as a magnet having the highest performance among permanent magnets. Conventionally, a rare earth sintered magnet has been widely used for a rotating device such as a servomotor or an elevator motor, a home appliance, and the like.

Particularly, for a rare earth sintered magnet, it is necessary to adapt to a high-temperature environment due to temperature increase when a rotating device is driven, and to prevent demagnetization due to a high temperature.

Therefore, a rare earth sintered magnet is required to have an excellent thermal tolerance and a high coercivity.

One of the most effective means for improving the coercivity of a rare earth sintered magnet is to use, as a material for a rare earth sintered magnet, an alloy having a composition in which light rare earth elements such as Nd are partially replaced with heavy rare earth elements such as Dy or Tb.

However, generally, a residual magnetic flux density of a rare earth sintered magnet contradicts a coercivity of a rare earth sintered magnet. Therefore, adding a heavy rare earth element such as Dy or Tb to a rare earth sintered magnet improves the coercivity of the rare earth sintered magnet. Meanwhile, the residual magnetic flux density of the rare earth sintered magnet is reduced. Therefore, it is difficult to achieve both of the coercivity and the residual magnetic flux density in the rare earth sintered magnet.

A heavy rare earth element such as Dy or Tb is a rare metal, and therefore the cost thereof is high. Therefore, it is desired to suppress the use amount of a heavy rare earth element such as Dy or Tb in terms of global environment conservation and magnet cost reduction.

In view of such a problem, in Patent Document 1, with regard to a permanent magnet used for a rotating device, a permanent magnet having a coercivity specially enhanced is coupled with a magnet having a low coercivity and a high residual magnetic flux density by an adhesive agent.

Thus, a permanent magnet having an enhanced coercivity can be used at a part where a temperature increases when a rotating electrical device is driven or where a demagnetization field from a stator is applied, and a permanent magnet having a high residual magnetic flux density can be used at the other part. Thus, a technique is disclosed in which coercivities of permanent magnets are selectively enhanced to achieve both of the residual magnetic flux density and the coercivity, thereby enabling reduction in the use amount of a heavy rare earth element.

In Patent Document 2, as a material for a permanent magnet, two kinds of material alloy powders of a first material alloy powder and a second material alloy powder are used which contain different amounts of heavy rare earth element. The first material alloy powder is a material alloy powder that contains no heavy rare earth element or contains a heavy rare earth element with a low content rate relative to the second material alloy powder. The second material alloy powder is a material alloy powder with a high content rate of heavy rare earth element relative to the first material alloy powder.

Further, a production method for R—Fe—B based sintered magnet is disclosed which includes a loading step of loading each of the first material alloy powder and the second material alloy powder into a predetermined space in a cavity formed by a mold, a step of obtaining a complex molded body composed of a first molded body portion made from the first material alloy powder and a second molded body portion made from the second material alloy powder, and a step of obtaining a sintered magnet or a permanent magnet having the first molded body portion and the second molded body portion coupled with each other by sintering the complex molded body.

In the loading step of this method, a partition in a vertical direction is provided in the cavity having a thin and long shape along the vertical direction, whereby the inside of the cavity is divided. Then, the first material alloy powder and the second material alloy powder are loaded into the divided cavities. Then, the partition in the cavity is removed, and the first material alloy powder and the second material alloy powder are pressurized and molded.

Thus, as in Patent Document 1, in the permanent magnet, the coercivity is selectively enhanced to achieve both of the residual magnetic flux density and the coercivity, thereby reducing the use amount of a heavy rare earth element.

In Patent Document 3, a material powder of an Nd2Fe14B compound alloy having a crystal grain composition, and a material powder of an alloy containing a heavy rare earth element such as Dy or Tb are separately produced, and then are mixed and sintered.

As a result of the sintering, the alloy containing the heavy rare earth element has a liquid phase. Then, the heavy rare earth element in the alloy is distributed so as to surround the Nd2Fe14B compound alloy. Therefore, in the permanent magnet, the coercivity can be increased while reduction in the residual magnetic flux density is suppressed.

In Patent Document 4, a fluoride containing a heavy rare earth element such as Dy or Tb is applied on a surface of a permanent magnet molded by sintering, and then thermal processing is conducted.

As a result of this thermal processing, the heavy rare earth element applied on the surface of the permanent magnet penetrates into the permanent magnet. Therefore, in the permanent magnet, the heavy rare earth element is present only at a desired portion.

Further, in the permanent magnet, by the thermal processing, the heavy rare earth element becomes denser only in the vicinity of an interface of a crystal grain, so that an anisotropy field in the vicinity of the interface of the crystal grain increases. Therefore, in the permanent magnet, the coercivity can be increased while reduction in the residual magnetic flux density is suppressed.

Thus, a production method for permanent magnet is disclosed which can achieve both of the residual magnetic flux density and the coercivity in a permanent magnet and reduce the use amount of a heavy rare earth element therein.

CITATION LIST

Patent Document

Patent Document 1: Japanese Laid-Open Patent Publication No. 60-219947 (pages 1 to 5)

Patent Document 2: Japanese Laid-Open Patent Publication No. 2010-98080 (paragraphs [0038] to [0046] and FIG. 6)

Patent Document 3: Japanese Laid-Open Patent Publication No. 5-21218

Patent Document 4: Japanese Laid-Open Patent Publication No. 2011-19401 (paragraphs [0015] to [0059])

SUMMARY OF THE INVENTION

Problems to be Solved by the Invention

However, in the method in which shape finishing for a tiny permanent magnet is performed by mechanical work and then bonding is performed as shown in Patent Document 1, the process of mechanical work is complicated, and yield deterioration may occur due to chipping or cracking of a magnet. Further, since the number of steps in the mechanical work increases, the cost may increase.

In addition, the first molded portion is produced in advance by loading the first material alloy powder into a mold. Then, the second molded portion is produced by loading the second material alloy powder into a mold. Then, the first molded portion and the second molded portion in contact with each other are integrated by a sintering step. In this method, the density distribution in the first molded portion after molding and the density distribution in the second molded portion after molding are different from each other. Therefore, the dimensions of contractions of the first molded portion and the second molded portion in the sintering are different from each other. Therefore, the first molded portion and the second molded portion are separated from each other upon contraction in sintering, so that their contact area is reduced. Therefore, there is a possibility that the first molded portion and the second molded portion cannot be integrated in close contact with each other sufficiently.

As shown in Patent Document 2, in a cross section of the permanent magnet, a region of the permanent magnet in which a high coercivity is needed because a demagnetization field from a stator is particularly strongly applied has a very small sectional area. Therefore, in order to place a material alloy powder having a high content rate of heavy rare earth element at this small area, if the method in which a partition is provided in the cavity elongated in the vertical direction to divide the cavity is used, the sectional area of each cavity becomes small and the depth of each cavity becomes deep. That is, the cavity has a small opening area and has a thin shape elongated in the depth direction.

When a material alloy powder is loaded into such a thin and long cavity having a small opening area, a bridge of the material alloy powder, a void, or the like occurs in the cavity, so that the material alloy powder cannot be loaded uniformly. Further, there is a problem that the cavity cannot be loaded with a predetermined amount of material alloy powder.

In addition, in the cavity elongated in the vertical direction, there is a problem that a material alloy powder present at a lower portion of the cavity is pressed by a material alloy powder present at an upper portion of the cavity, and thereby consolidated, so that the orientation degree is deteriorated. In addition, while compression and molding are performed, a difference in the loading density of the material alloy powder caused in the cavity when the material alloy powder is loaded keeps a value at the time of molding. Therefore, a density difference in the height direction of the permanent magnet occurs, and as a result, the compression rate after sintering differs. Therefore, there is a problem that distortion of the permanent magnet sintered body increases and the deformation amount thereof increases.

In addition, there is a problem that a crack or a fracture occurs at the interface between the first molded portion and the second molded portion due to the difference in the loading density in the depth direction and the horizontal direction of the material alloy powder.

Further, in the method in which the cavity is divided by a partition and loaded, and then the partition is removed before pressurizing and molding, a space corresponding to the thickness of the partition is formed. Therefore, at the region where the partition has been provided, the loading density of the material alloy powder becomes low. As a result, there is a problem that the shape of the permanent magnet is distorted by contraction in sintering and a crack, a fracture, or the like occurs at the interface.

The method shown in Patent Document 3 needs to prepare and mix two kinds of material powders with different densities of heavy rare earth element, and therefore the number of steps in working increases.

Further, the heavy rare earth elements are mixed over the entire permanent magnet, and this permanent magnet is sintered at as high temperature as about 1000° C. Therefore, the heavy rare earth element diffuses to the inside of a crystal grain due to the high temperature, and the residual magnetic flux density reduces. As a result, reduction of the residual magnetic flux density may become great over the entire permanent magnet.

In the method shown in Patent Document 4, a heavy rare earth element is applied on a surface of a sintered permanent magnet, and then the heavy rare earth element is caused to penetrate into the permanent magnet by thermal processing.

However, since a material powder for the permanent magnet is compressed and sintered to be molded, the powder density of the molded permanent magnet is high. Therefore, the heavy rare earth element hardly penetrates into the permanent magnet.

Therefore, the heavy rare earth element is present only in the surface of the permanent magnet. Therefore, the coercivity at a desired portion of the permanent magnet cannot be enhanced sufficiently. Further, the density of the heavy rare earth element in the surface of the permanent magnet becomes excessively high, whereby the residual magnetic flux density excessively reduces.

In addition, it requires a long time and a high thermal processing temperature to cause the heavy rare earth element penetrate to a certain depth from the surface of the permanent magnet.

However, if the thermal processing temperature becomes excessively high, the heavy rare earth element diffuses to the inside of a crystal grain, whereby the residual magnetic flux density may be deteriorated. In addition, in the case of taking a long time for the penetration, the productivity is deteriorated due to excessive increase in production time.

The present invention has been made to solve the above problems, and an object of the present invention is to provide a production method for permanent magnet, a production device for permanent magnet, a permanent magnet and a rotating electrical device so that the permanent magnet has an improved coercivity and an improved residual magnetic flux density and the use amount of a rare earth element therein is reduced.

Solution to the Problems

A production method for permanent magnet according to the present invention includes: a loading step of loading a magnetic powder into a cavity formed by a mold; and a pressurizing step of pressurizing the magnetic powder in the cavity, thereby compressing and molding the magnetic powder, wherein the cavity is formed in a groove shape such that a longitudinal direction of the cavity extends in a horizontal direction, and the loading step includes a first loading step of loading, of the magnetic powder, a first magnetic powder which contains no heavy rare earth element or contains a heavy rare earth element, and a second loading step of loading, of the magnetic powder, a second magnetic powder at a predetermined position in the cavity, a content rate of the heavy rare earth element in the second magnetic powder being higher than that in the first magnetic powder.

A production device for permanent magnet according to the present invention is a production device for permanent magnet, in which a magnetic powder is loaded into a cavity formed by a mold and the magnetic powder in the cavity is pressurized, whereby the magnetic powder is compressed and molded, wherein the cavity is formed in a groove shape such that a longitudinal direction of the cavity extends in a horizontal direction, the production device including: a first lid portion for closing the cavity with the magnetic powder loaded therein, the first lid portion having a preliminary molding portion formed at a predetermined position at a cavity side; and a second lid portion for closing the cavity with the magnetic powder loaded therein, the second lid portion having a molding portion at the cavity side, wherein the preliminary molding portion is capable of, by depressing the magnetic powder in the cavity with the preliminary molding portion, transferring a shape of the preliminary molding portion and molding the magnetic powder in which a dent is formed at the predetermined position, and the molding portion is capable of, by depressing the magnetic powder in the cavity with the molding portion, transferring a shape of the molding portion and molding the magnetic powder.

A permanent magnet according to the present invention is a permanent magnet produced using a production method for permanent magnet, the production method including: a loading step of loading a magnetic powder into a cavity formed by a mold; and a pressurizing step of pressurizing the magnetic powder in the cavity, thereby compressing and molding the magnetic powder, wherein the cavity is formed in a groove shape such that a longitudinal direction of the cavity extends in a horizontal direction, and the loading step includes a first loading step of loading, of the magnetic powder, a first magnetic powder which contains no heavy rare earth element or contains a heavy rare earth element, and a second loading step of loading, of the magnetic powder, a second magnetic powder at a predetermined position in the cavity, a content rate of the heavy rare earth element in the second magnetic powder being higher than that in the first magnetic powder.

A rotating electrical device according to the present invention includes a rotor having permanent magnets arranged at regular intervals in a circumferential direction, the permanent magnets being produced using a production method for permanent magnet, the production method including: a loading step of loading a magnetic powder into a cavity formed by a mold; and a pressurizing step of pressurizing the magnetic powder in the cavity, thereby compressing and molding the magnetic powder, wherein the cavity is formed in a groove shape such that a longitudinal direction of the cavity extends in a horizontal direction, and the loading step includes a first loading step of loading, of the magnetic powder, a first magnetic powder which contains no heavy rare earth element or contains a heavy rare earth element, and a second loading step of loading, of the magnetic powder, a second magnetic powder at a predetermined position in the cavity, a content rate of the heavy rare earth element in the second magnetic powder being higher than that in the first magnetic powder.

A production method for permanent magnet according to the present invention includes: a loading step of loading a permanent magnet material into a cavity formed by a mold; and a pressurizing step of pressurizing the permanent magnet material in the cavity, thereby compressing and molding the permanent magnet material, wherein the cavity is formed in a groove shape such that a longitudinal direction of the cavity extends in a horizontal direction, and the loading step includes a first loading step of loading, of the permanent magnet material, a first permanent magnet material which contains no heavy rare earth element or contains a heavy rare earth element, and a second loading step of loading, of the permanent magnet material, a second permanent magnet material in a slurry state prepared by kneading a heavy rare earth element with a solvent, at a predetermined position in the cavity.

A production method for permanent magnet according to the present invention includes: a loading step of loading a permanent magnet material into a cavity formed by a mold; and a pressurizing step of pressurizing the permanent magnet material in the cavity, thereby compressing and molding the permanent magnet material, wherein the cavity is formed in a groove shape such that a longitudinal direction of the cavity extends in a horizontal direction, and the loading step includes a first loading step of loading, of the permanent magnet material, a first permanent magnet material which contains no heavy rare earth element or contains a heavy rare earth element, a second loading step of loading, of the permanent magnet material, a third permanent magnet material prepared by powdering a heavy rare earth element, at a predetermined position in the cavity, and a first swing step of swinging the permanent magnet material loaded in the cavity.

A production device for permanent magnet according to the present invention is a production device for permanent magnet in which a permanent magnet material is loaded into a cavity formed by a mold and the permanent magnet material in the cavity is pressurized, whereby the permanent magnet material is compressed and molded, wherein the cavity is formed in a groove shape such that a longitudinal direction of the cavity extends in a horizontal direction, the production device including an ejection portion capable of ejecting, of the permanent magnet material, a permanent magnet material in a slurry state into the cavity.

A permanent magnet according to the present invention is a permanent magnet produced using a production method for permanent magnet, the production method including: a loading step of loading a permanent magnet material into a cavity formed by a mold; and a pressurizing step of pressurizing the permanent magnet material in the cavity, thereby compressing and molding the permanent magnet material, wherein the cavity is formed in a groove shape such that a longitudinal direction of the cavity extends in a horizontal direction, and the loading step includes a first loading step of loading, of the permanent magnet material, a first permanent magnet material which contains no heavy rare earth element or contains a heavy rare earth element, and a second loading step of loading, of the permanent magnet material, a second permanent magnet material in a slurry state prepared by kneading a heavy rare earth element with a solvent, at a predetermined position in the cavity.

A permanent magnet according to the present invention is a permanent magnet produced using a production method for permanent magnet, the production method including: a loading step of loading a permanent magnet material into a cavity formed by a mold; and a pressurizing step of pressurizing the permanent magnet material in the cavity, thereby compressing and molding the permanent magnet material, wherein the cavity is formed in a groove shape such that a longitudinal direction of the cavity extends in a horizontal direction, and the loading step includes a first loading step of loading, of the permanent magnet material, a first permanent magnet material which contains no heavy rare earth element or contains a heavy rare earth element, a second loading step of loading, of the permanent magnet material, a third permanent magnet material prepared by powdering a heavy rare earth element, at a predetermined position in the cavity, and a first swing step of swinging the permanent magnet material loaded in the cavity.

A rotating electrical device according to the present invention includes a rotor having permanent magnets arranged at regular intervals in a circumferential direction, the permanent magnets being produced using a production method for permanent magnet, the production method including: a loading step of loading a permanent magnet material into a cavity formed by a mold; and a pressurizing step of pressurizing the permanent magnet material in the cavity, thereby compressing and molding the permanent magnet material, wherein the cavity is formed in a groove shape such that a longitudinal direction of the cavity extends in a horizontal direction, and the loading step includes a first loading step of loading, of the permanent magnet material, a first permanent magnet material which contains no heavy rare earth element or contains a heavy rare earth element, and a second loading step of loading, of the permanent magnet material, a second permanent magnet material in a slurry state prepared by kneading a heavy rare earth element with a solvent, at a predetermined position in the cavity.

A rotating electrical device according to the present invention includes a rotor having permanent magnets arranged at regular intervals in a circumferential direction, the permanent magnets being produced using a production method for permanent magnet, the production method including: a loading step of loading a permanent magnet material into a cavity formed by a mold; and a pressurizing step of pressurizing the permanent magnet material in the cavity, thereby compressing and molding the permanent magnet material, wherein the cavity is formed in a groove shape such that a longitudinal direction of the cavity extends in a horizontal direction, and the loading step includes a first loading step of loading, of the permanent magnet material, a first permanent magnet material which contains no heavy rare earth element or contains a heavy rare earth element, a second loading step of loading, of the permanent magnet material, a third permanent magnet material prepared by powdering a heavy rare earth element, at a predetermined position in the cavity, and a first swing step of swinging the permanent magnet material loaded in the cavity.

A permanent magnet for rotating electrical device according to the present invention is a permanent magnet for rotating electrical device to be provided in a rotating electrical device, the permanent magnet formed by an R-T-B based rare earth magnet, where R represents at least one rare earth element of Nd, Pr, Dy, and Tb, and T represents a transition metal element including Fe or Fe and Co, wherein the permanent magnet contains a heavy rare earth element such that a density of the heavy rare earth element at both corner portions in a rotation direction of the permanent magnet, in a circumferential surface facing a stator of the rotating electrical device, is higher than a density of the heavy rare earth element at the other part, and a density of the heavy rare earth element continuously decreases from both corner portions toward a central portion, and a density of the heavy rare earth element inside an R2T14B crystal phase is uniformly distributed.

Effect of the Invention

Owing to the above configurations, the production method for permanent magnet, the production device for permanent magnet, the permanent magnet and the rotating electrical device according to the present invention make it possible to provide a production method for permanent magnet, a production device for permanent magnet, a permanent magnet and a rotating electrical device so that the permanent magnet has an improved balance between the coercivity and the residual magnetic flux density and the use amount of a rare earth element therein is reduced.

DESCRIPTION OF EMBODIMENTS

Embodiment 1

First, the structures of a permanent magnet 50 and a permanent magnet rotating electrical device 40 formed by using the permanent magnet 50, according to embodiment 1 of the present invention, will be described with reference to the drawings.

Figure 1:
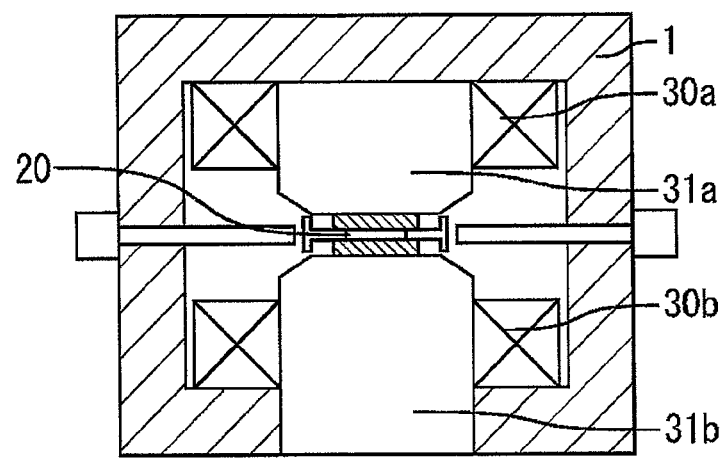
FIG. 1 is a sectional view showing the structure of a production device for permanent magnet according to embodiment 1 of the present invention, and shows the direction of a magnetic field in the production device for permanent magnet.
Figure 1:
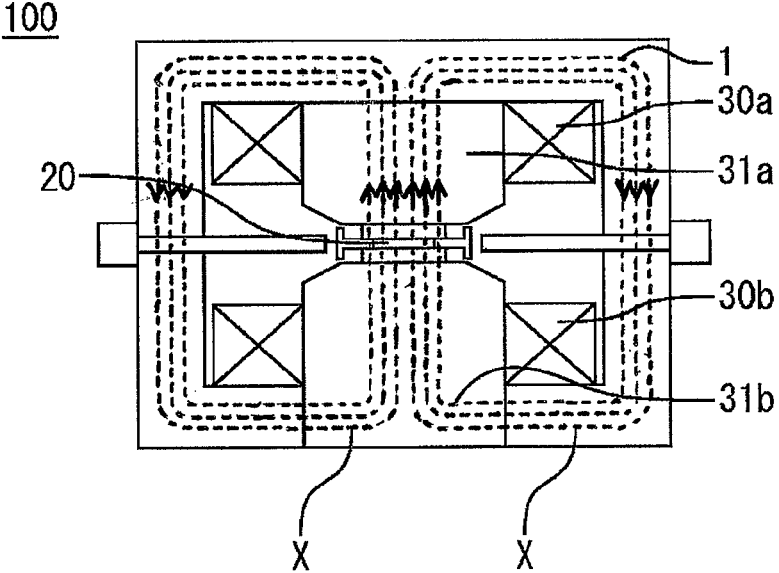

FIG. 1 is a sectional view showing the structure of a production device 100 for permanent magnet. Further, FIG. 1 shows the direction of a magnetic field in the production device 100 for permanent magnet.

Figure 2:
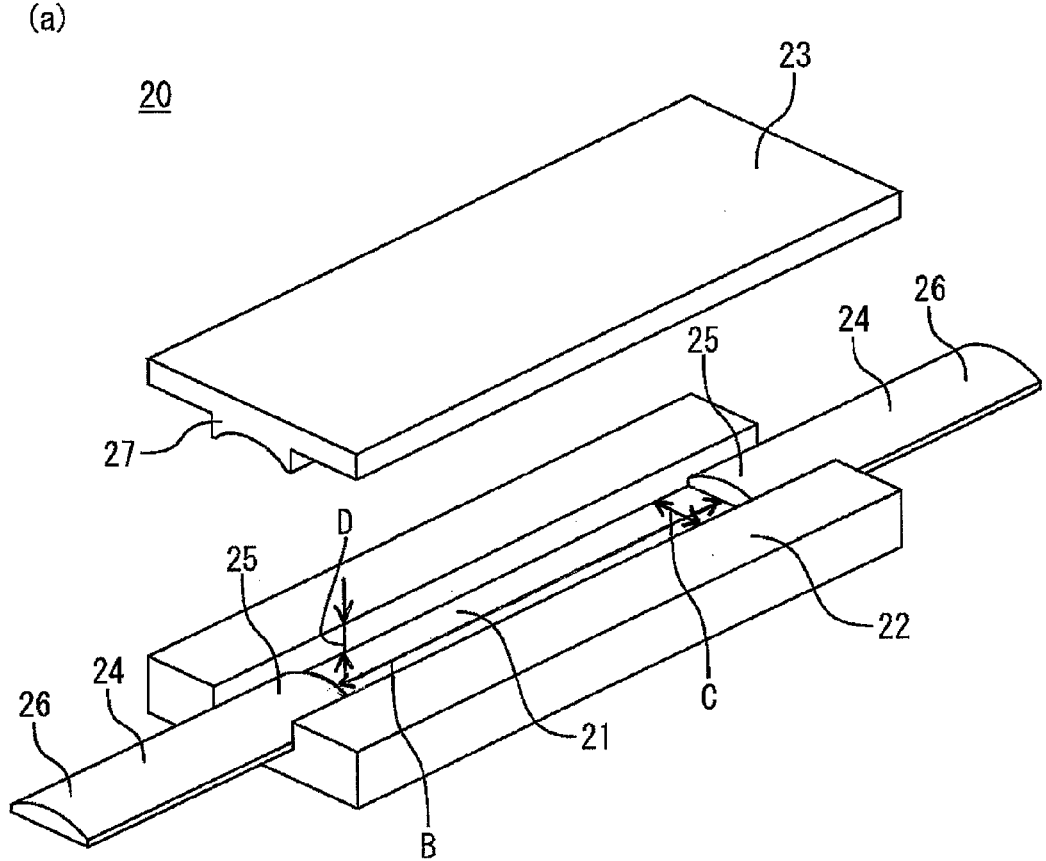
FIG. 2 is a perspective view and a sectional view showing the structure of a mold according to embodiment 1 of the present invention.
Figure 2:
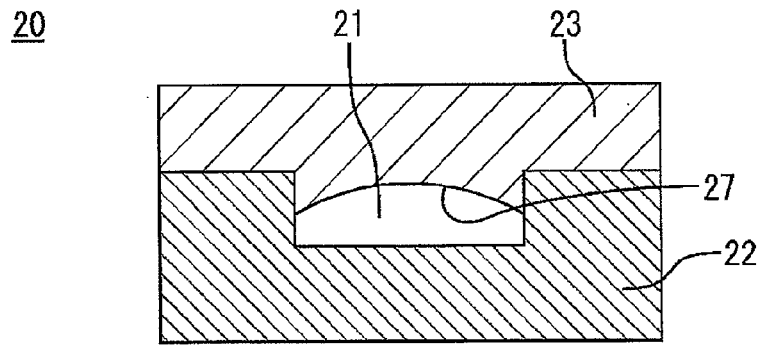

FIG. 2 is a perspective view showing the structure of a mold 20 and a sectional view of a cavity 21 along the short-side direction.

Figure 3:
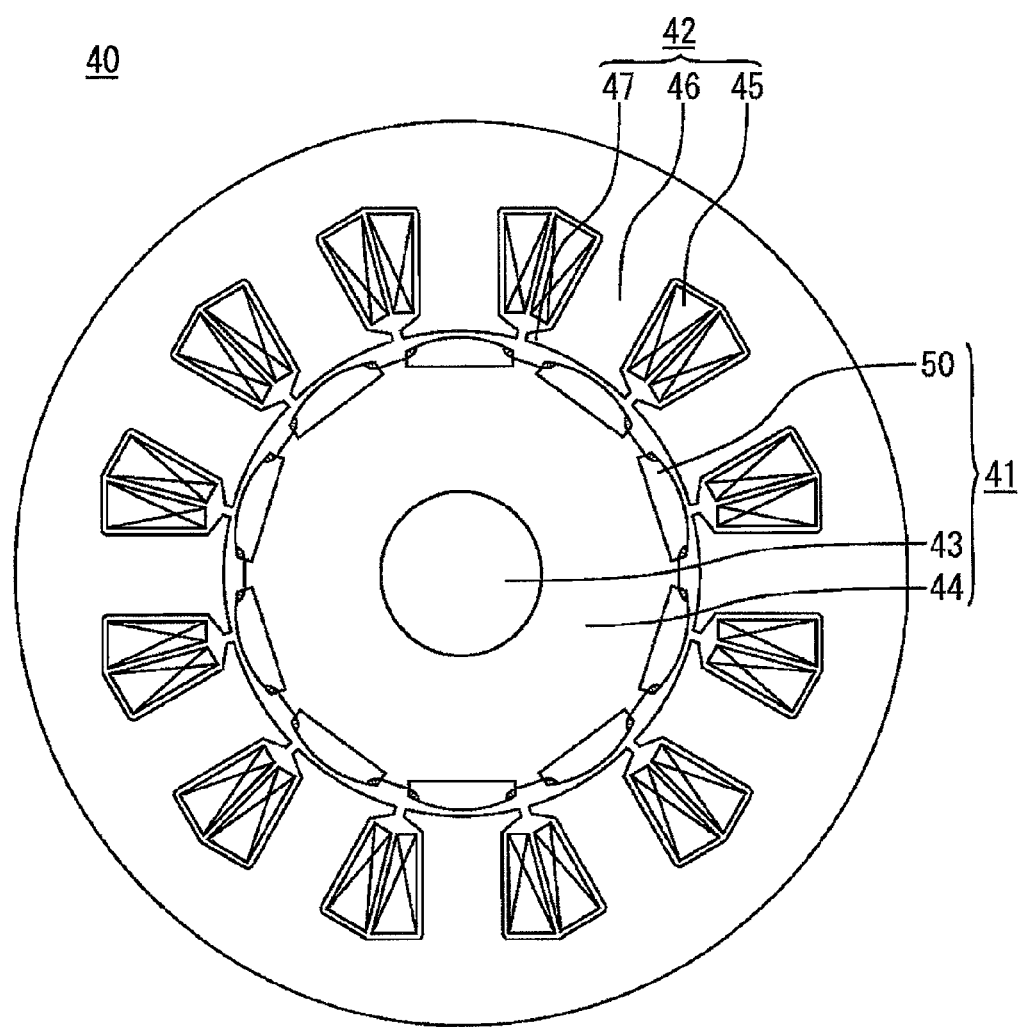
FIG. 3 is a plan view showing the structure of a permanent magnet rotating electrical device according to embodiment 1 of the present invention.

FIG. 3 is a plan view showing the structure of the permanent magnet rotating electrical device 40.

Figure 4:
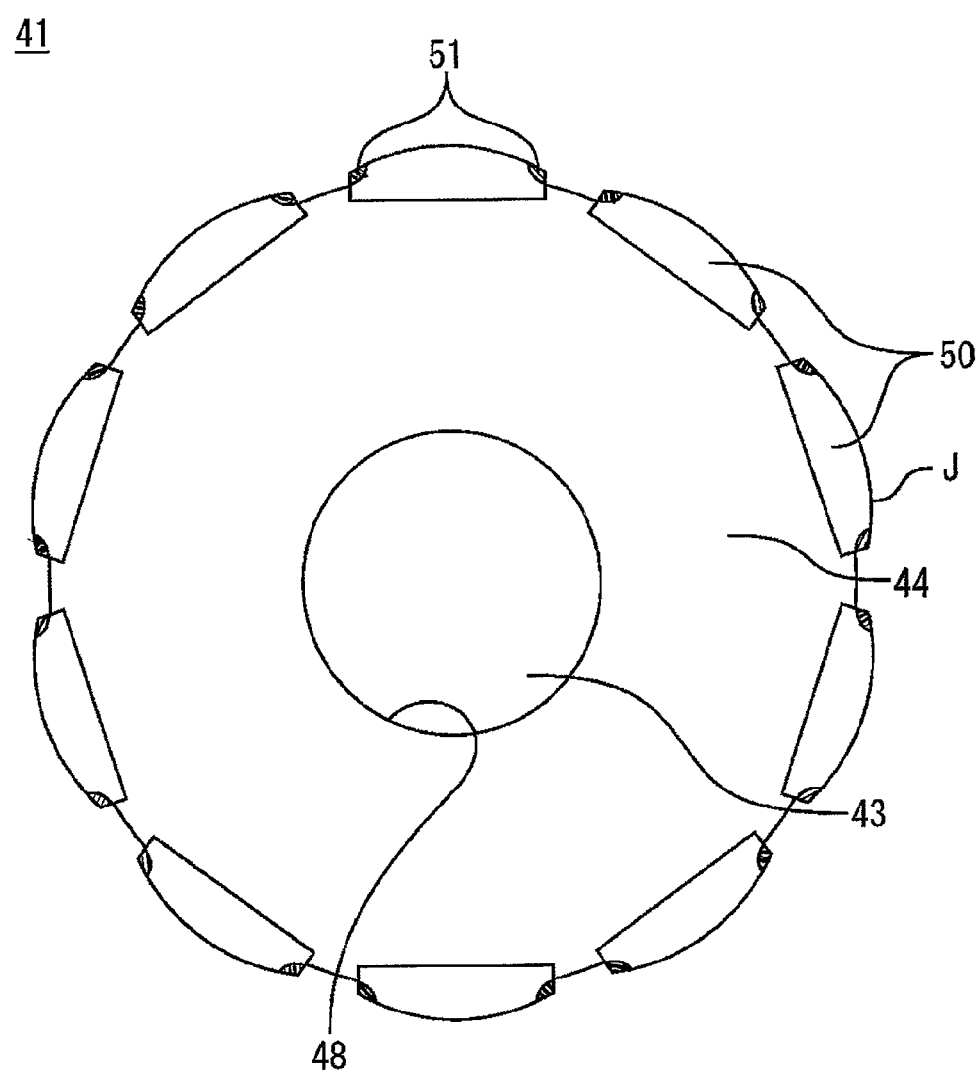
FIG. 4 is a plan view showing the structure of a rotor of the permanent magnet rotating electrical device according to embodiment 1 of the present invention.

FIG. 4 is a plan view showing the structure of a rotor 41 of the permanent magnet rotating electrical device 40.

Figure 5:
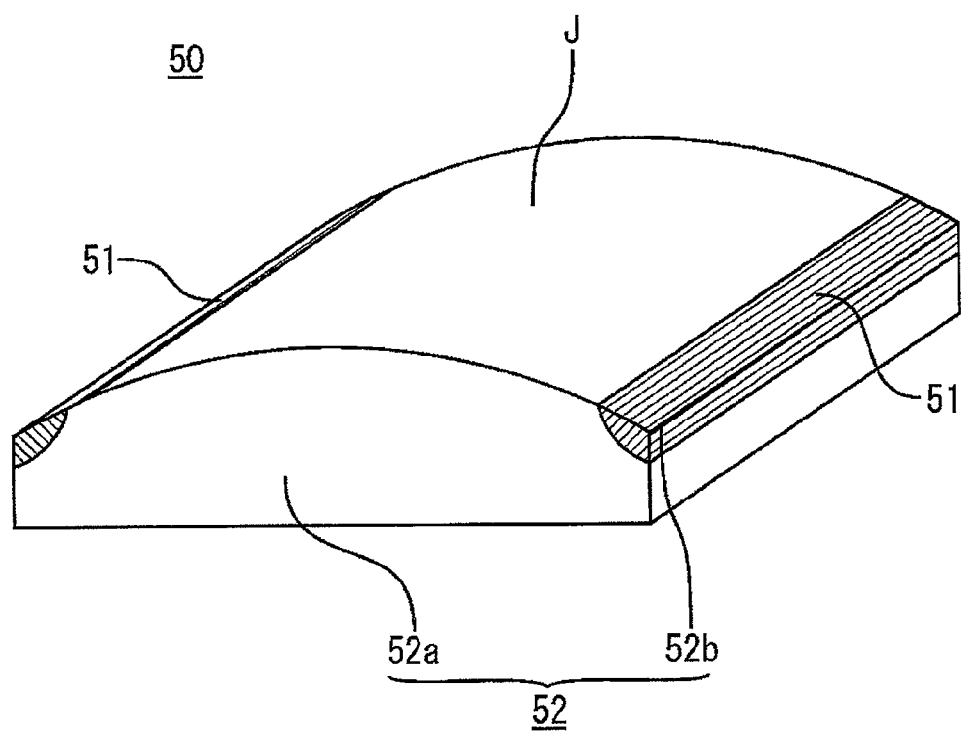
FIG. 5 is a perspective view showing the structure of a permanent magnet of the permanent magnet rotating electrical device according to embodiment 1 of the present invention.

FIG. 5 is a perspective view showing the structure of the permanent magnet 50 of the permanent magnet rotating electrical device 40.

Figure 6:
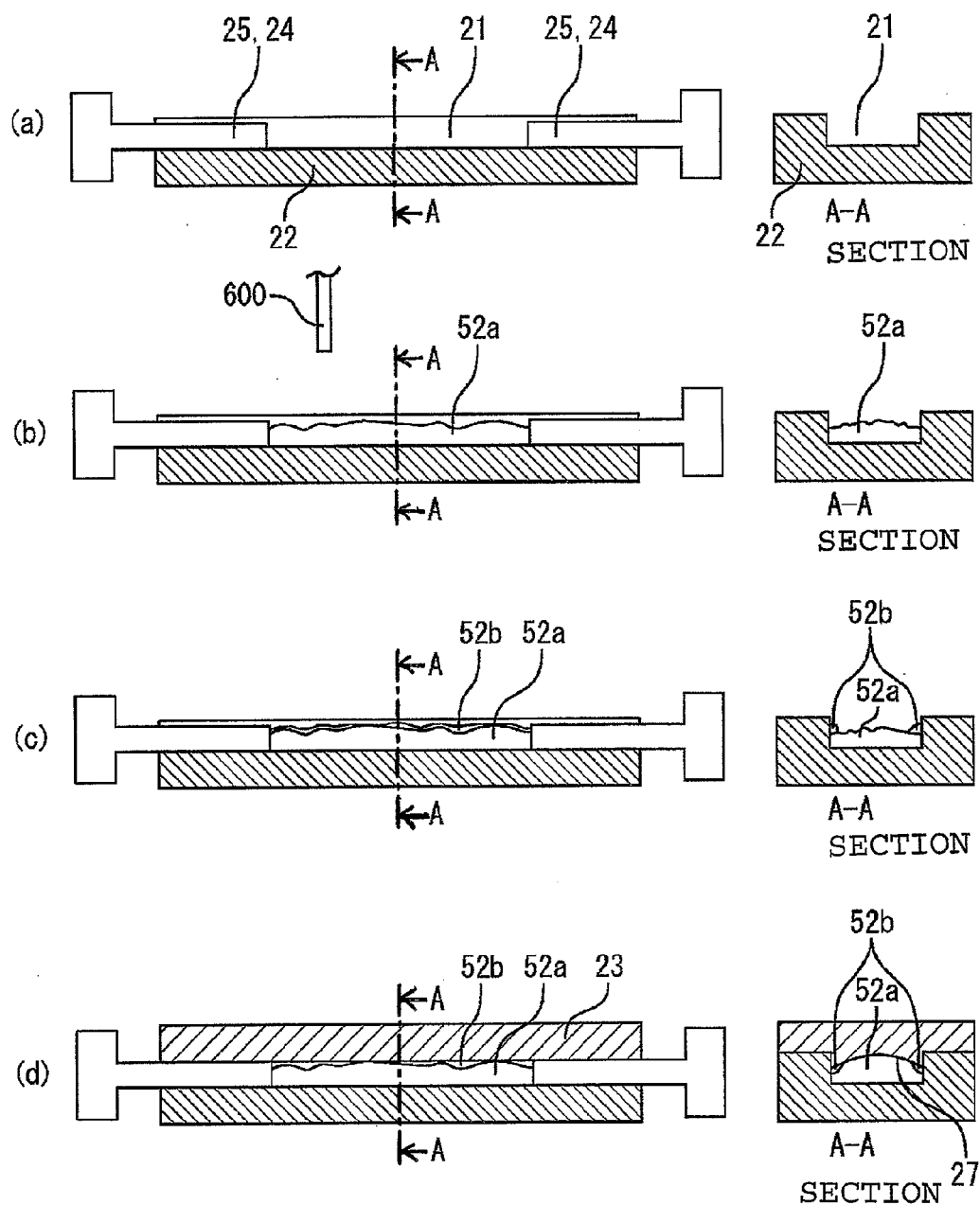
FIG. 6 is a sectional view of the production device for permanent magnet, showing a process for loading a magnetic powder in the production device for permanent magnet, according to embodiment 1 of the present invention.

FIG. 6 is sectional views along the longitudinal direction and the short-side direction of the cavity 21 of the production device 100 for permanent magnet, showing a process for loading first and second magnetic powders 52a and 52b into the cavity 21 formed by the mold 20.

As shown in FIG. 3, the permanent magnet rotating electrical device 40 (hereinafter, referred to as a rotating electrical device 40) is used as a motor or the like. The rotating electrical device 40 is mainly composed of the rotor 41 and a stator 42 placed at the outer circumferential side of the rotor 41.

The stator 42 is formed by steel sheets stacked along the outer circumference of the rotor 41. The stacked steel sheets have twelve teeth 46 extending radially inward of the rotating electrical device 40.

Each tooth 46 has a shoe 47 which is a portion where a width dimension of the tooth 46 is enlarged toward the circumferential direction of the rotating electrical device 40.

Each tooth 46 has a coil 45 formed by winding a conductive wire (in the present embodiment, a copper member is used) thereon. Between the coil 45 and the tooth 46, a resin member (not shown) for ensuring insulation therebetween is provided.

It is noted that the number of the teeth 46 of the stator 42 and the magnetic pole number of the rotor 41 are not limited to twelve and ten, respectively. For example, two poles and three slots, ten poles and twelve slots, or eight poles and twelve slots may be employed.

The rotor 41 has an iron core 44 formed by stacking a plurality of steel sheets. As shown in FIG. 4, the iron core 44 has a through hole 48 through which a central shaft 43 passes.

At the outer circumferential side of the iron core 44, ten permanent magnets 50 are placed at regular intervals along the circumferential direction such that the adjacent permanent magnets 50 form N pole and S pole alternately with respect to the circumferential direction, along the outer circumference.

As shown in FIG. 5, the permanent magnet 50 has a shape obtained by combining a cuboid portion having a bottom surface and front, rear, right, and left surfaces, and a semicylindrical portion having a top surface (hereinafter, referred to as a circumferential surface J).

As shown in FIG. 3, each permanent magnet 50 is placed in the rotor 41 such that the longitudinal direction of the permanent magnet 50 extends in the axial direction of the rotating electrical device 40. In this case, a shaded portion of the permanent magnet 50 shown in FIG. 5 (hereinafter, referred to as a corner portion 51) is a portion subjected to a particularly great demagnetization field from the stator 42 when the rotating electrical device 40 is driven.

As shown in FIG. 4, the corner portions 51 are formed at both end regions of the circumferential surface J of the permanent magnet 50. The positions where the corner portions 51 are formed are arranged in the direction in which the rotor 41 is rotated by a magnetic field from the stator 42.

As shown in FIG. 5, the permanent magnet 50 is formed by two kinds of magnetic powders 52 of the first magnetic powder 52a and the second magnetic powder 52b.

A difference between the first magnetic powder 52a and the second magnetic powder 52b is a content rate of heavy rare earth element. The first magnetic powder 52a contains no heavy rare earth element or has a lower content rate of heavy rare earth element than a content rate of heavy rare earth element in the second magnetic powder 52b.

The second magnetic powder 52b has a higher content rate of heavy rare earth element than the content rate of heavy rare earth element in the first magnetic powder 52a.

The corner portion 51 which is subjected to a particularly great demagnetization field from the stator 42 is formed by the second magnetic powder 52b. A region other than the corner portion 51, of the permanent magnet 50, is formed by the first magnetic powder 52a.

The shape of the permanent magnet 50 may be other than the above shape. For example, a rectangular-plate magnet having a rectangular sectional shape or a plate-like magnet having an arc-plate sectional shape may be used. The same applies in the following embodiments, and therefore such a description is omitted as appropriate.

Next, the structure of the production device 100 for permanent magnet for manufacturing the permanent magnet 50 will be described with reference to FIG. 1.

As shown in FIG. 1, the production device 100 for permanent magnet (hereinafter, referred to as a device 100) includes a rack 1 formed by a ferromagnetic member having a rectangular-frame sectional shape.

In the internal space of the rack 1 having a rectangular frame shape, a pair of circular electromagnets 30a and 30b as a magnetic field generating portion are provided above and below so as to be opposed to each other in the height direction.

At the inner circumferential sides of the electromagnets 30a and 30b, a pair of upper and lower pole pieces 31a and 31b formed by ferromagnetic members are provided.

The upper pole piece 31a is formed such that the diameter thereof gradually decreases downward. The lower pole piece 31b is formed such that the diameter thereof gradually decreases upward.

A gap is present between the pole piece 31a and the pole piece 31b.

As shown in FIG. 1(b), a magnetic field X generated from the electromagnets 30a and 30b, which is represented by a dot line, passes through the pole piece 31b and then the gap between the pole pieces 31a and 31b, to flow toward the pole piece 31a opposed to the pole piece 31b, and further, passes through the rack 1, to return to the pole piece 31b. Thus, by using the rectangular-frame-shaped rack 1, the magnetic field X flows through a closed magnetic circuit.

A mold 20 is placed in the gap between the pole pieces 31a and 31b.

The mold 20 shown in FIG. 2 is a mold to be loaded with a magnetic powder 52 which is a material for the permanent magnet 50, so that the loaded magnetic powder 52 is pressurized and molded.

The mold 20 is mainly composed of a die 22, a lid portion 23, and a punch 24.

The die 22 has a U-shaped cavity 21 having an angular sectional shape. The cavity 21 is formed in a groove shape whose longitudinal direction horizontally extends to end surfaces of the die 22.

The lid portion 23 is fitted to a fitting surface of the die 22 so as to cover the cavity 21 from above. Thus, the cavity 21 is configured to be closable. The lid portion 23 has a molding portion 27 at the cavity 21 side.

The molding portion 27 is a portion for molding the upper side of the magnetic powder 52 loaded in the cavity 21.

Each punch 24 is provided so as to block both ends in the longitudinal direction of the cavity 21. Each punch 24 has a pressed portion 26 at one end thereof. Each punch 24 has, at the other end thereof, a pressurizing portion 25 having the same sectional shape as that of the cavity 21. The punches 24 are a pair of pressurizing mechanism portions for pressurizing the magnetic powder 52 loaded in the cavity 21 from the horizontal direction.

The pressurizing portions 25 of the punches 24 are slidable so as to move close to or away from each other in the extending direction of the cavity 21, while being fitted into the cavity 21 formed by the die 22 and the lid portion 23.

A pressurizing cylinder (not shown) for sliding the punch 24 is provided in the outward direction of each pressed portion 26. When the pressurizing cylinder is operated, a piston (not shown) presses a pressing rod (not shown). Then, the pressing rod (not shown) slides a guide member (not shown) to press the pressed portion 26 of the punch 24. Then, the pressurizing portions 25 of both punches 24 slide in directions to approach each other.

As shown in FIG. 1(b), the pressurizing direction by each punch 24 is perpendicular to the magnetic field X generated by the electromagnets 30a and 30b.

The mold 20 can be separated from the device 100 composed of the magnetic field generating portion including the electromagnets 30a and 30b and the pole pieces 31a and 31b, the pressurizing portions, and the rack 1.

Next, a method for producing the permanent magnet 50 using the device 100 will be described.

As the magnetic powders 52 which are materials for the permanent magnet 50, an Nd—Fe—B based rare earth permanent magnet powder (first magnetic powder 52a) having a composition in which the content rate of Dy which is a heavy rare earth element is comparatively low, and an Nd—Fe—B based rare earth magnet powder (second magnetic powder 52b) having a composition in which the content rate of Dy is higher than that in the first magnetic powder 52a, are prepared. The Nd—Fe—B based rare earth magnet powder is a kind of R-T-B based rare earth magnet (R represents at least one rare earth element of Nd, Pr, Dy, and Tb, and T represents a transition metal element including Fe or Fe and Co). Even in the case where the Nd—Fe—B based rare earth magnet powder is another kind of R-T-B based rare earth magnet, the following embodiments can be performed in the same manner, so the description thereof is omitted as appropriate.

First, a process for preparing the two kinds of magnetic powders 52 will be described.

A material alloy for the first permanent magnet powder is prepared which is composed of a light rare earth element by 1.5 mass %, B (boron) by 0.5 to 1.5 mass %, and the balance of Fe and inevitable impurity.

In embodiment 1 of the present invention, a strip casting method is used in which, under argon gas atmosphere, heating is performed at about 1500° C., to obtain a molten metal by high-frequency melting, and then the molten metal is rapidly cooled by a single roll method, to produce a scale-like alloy having a plate thickness of about 0.3 mm.

Next, a material alloy composed of a light rare earth element by 27.5 mass %, a heavy rare earth element by about 1.5 to 10 mass %, B (boron) by 0.5 to 1.5 mass %, and the balance of Fe and inevitable impurity, is produced by the strip casting method as in the above, to prepare a material alloy for the second permanent magnet powder.

Thereafter, the material alloys for the first and second permanent magnet powders are each thermally processed individually in a hydrogen furnace, thus being subjected to hydrogen embrittlement. At this time, each material alloy is fractured into pieces with sizes of about 0.1 to several mm, thus becoming a coarse powder.

Further, the coarse powders for the first and second permanent magnets are individually put into a jet mill crushing device, to be pulverized into a size of 0.1 to 15 µm, generally, a size of about 3.5 µm, thus obtaining the first and second magnetic powders 52a and 52b.

That is, during a process from production of the material alloys to production of the magnetic powders 52, the first and second magnetic powders 52a and 52b are individually processed and produced without being mixed.

It is noted that the first magnetic powder 52a may contain Dy or may not contain Dy. In addition, the first magnetic powder 52a may have such a coercivity that, in a region inside the permanent magnet 50 where a demagnetization field from the stator 42 is weak, the permanent magnet 50 is not be demagnetized by the demagnetization field.

On the other hand, the second magnetic powder 52b needs to have a coercivity so sufficient that the second magnetic powder 52b is not demagnetized even when being subjected to a strong demagnetization field from the stator 42. Therefore, the second magnetic powder 52b is formed with a high content rate of Dy.

Next, a method for producing the permanent magnet 50 using the first and second magnetic powders 52a and 52b will be described with reference to the drawings.

First, as shown in FIG. 6(a), before the mold 20 is placed in the gap between the pole pieces 31a and 31b, the lid portion 23 is detached.

Then, the length of the cavity 21 formed by the pressurizing portions 25 of both punches 24 being separated from each other is set to be about two or three times the longitudinal dimension of the permanent magnet 50.

Next, as shown in FIG. 6(b), the first magnetic powder 52a by a predetermined weight is loaded into the cavity 21.

At this time, the first magnetic powder 52a is loaded so as to fill the cavity 21, while being uniformed throughout the cavity 21.

The above loading step of performing processing from the state in FIG. 6(a) to the state in FIG. 6(b) is referred to as a first loading step.

Next, as shown in FIG. 6(c), the second magnetic powder 52b is loaded in a predetermined region in the cavity 21.

The predetermined region is a region corresponding to a portion of the molded permanent magnet 50 where an especially high coercivity is required.

For example, in the present embodiment, in the case of molding the permanent magnet 50 whose sectional shape is a rectangular shape, a shape obtained by combining a cuboid portion and a semicylindrical portion, or an arc-plate shape, the region where a high coercivity is required because a demagnetization field from the stator 42 is especially strongly applied thereto is both end regions (corner portions 51 shown above in FIG. 5) of the circumferential surface of the permanent magnet 50.

Therefore, it is necessary to load the second magnetic powder 52b having a high coercivity into the corner portion 51. Accordingly, as the predetermined region, the second magnetic powder 52b is loaded in a region that is on the first magnetic powder 52a loaded in the cavity 21 and extends along the longitudinal inner wall of the cavity 21.

The loading step of performing processing from the state in FIG. 6(b) to the state in FIG. 6(c) is referred to as a second loading step.

In each loading step, an opening region of the cavity 21 through which the magnetic powder 52 is put is a strip-like region having the longitudinal length (indicated by B in FIG. 2) of the cavity 21 and the short-side length (indicated by C in FIG. 2) of the cavity 21, when the cavity 21 is seen from above in the vertical direction.

Thus, since the opening region of the cavity 21 is large, in each loading step, a bridge or a void of the magnetic powder 52 which could be caused when the magnetic powder 52 is loaded into the cavity 21 can be prevented.

Further, the depth (indicated by D in FIG. 2) of the cavity 21 is as shallow as about 5 to 25% of the longitudinal length (B) of the cavity 21. Therefore, the magnetic powder 52 can be loaded with a uniform loading density without a bottom portion of the loaded magnetic powder 52 being consolidated by self-weight.

Further, the second magnetic powder 52b can be accurately and easily placed in the corner portion 51 region of the permanent magnet 50 where a high coercivity is required.

Next, as shown in FIG. 6(d), the cavity 21 is lidded being covered by the lid portion 23, whereby the cavity 21 is closed. Then, the molding portion 27 of the lid portion 23 depresses the first magnetic powder 52a and the second magnetic powder 52b in the cavity 21, whereby the shape of the molding portion 27 is transferred and the first magnetic powder 52a and the second magnetic powder 52b are molded.

The above step of performing processing from the state in FIG. 6(c) to the state in FIG. 6(d) is referred to as a closing step.

Figure 7:
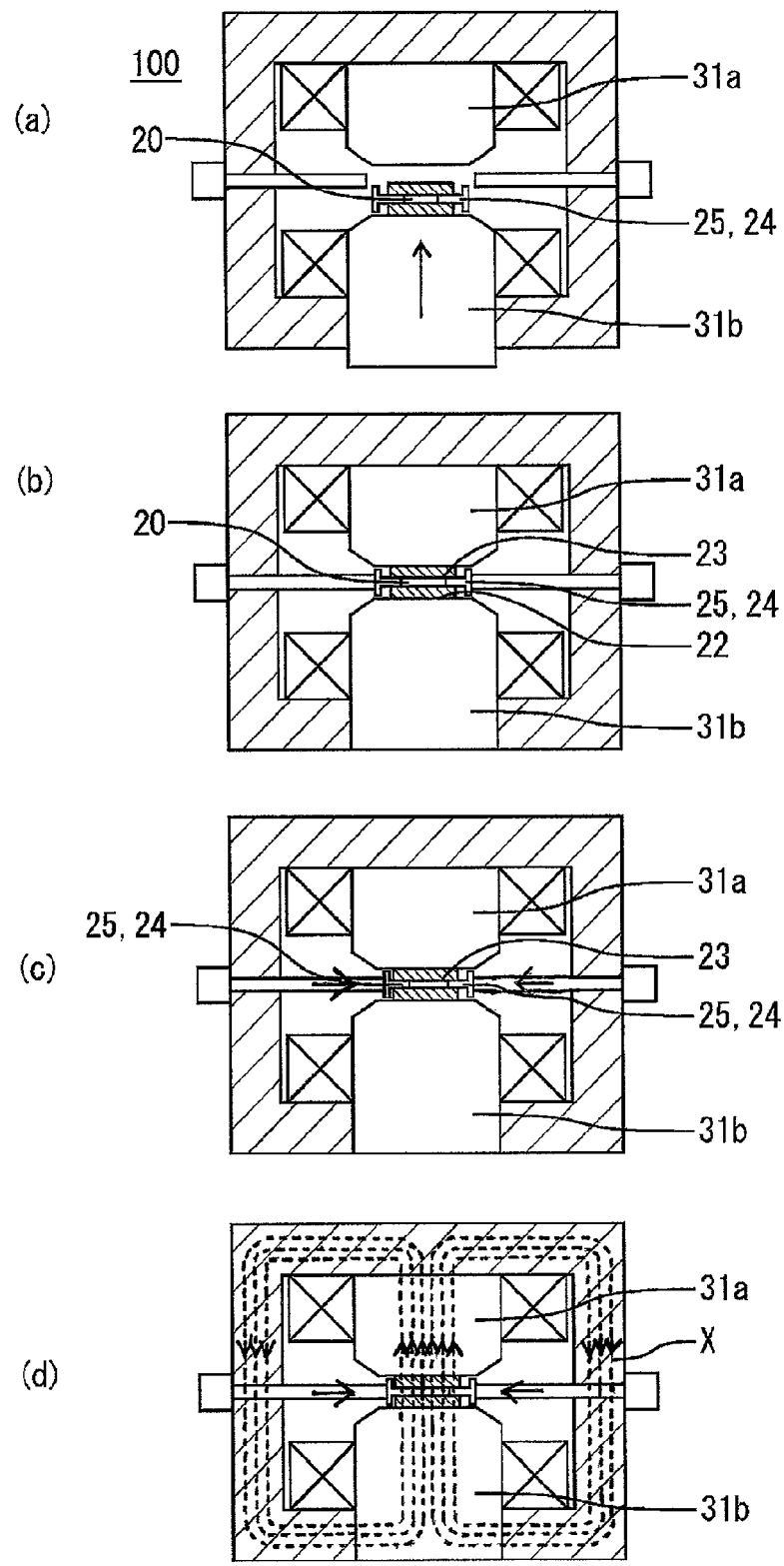
FIG. 7 is a sectional view of the production device for permanent magnet, showing operation of the production device for permanent magnet according to embodiment 1 of the present invention.

FIG. 7 is a sectional view showing the mold 20 for which the above loading step and closing step have been performed, and operation of the device 100 in which the mold 20 is placed.

Next, as shown in FIG. 7(a), the pole pieces 31a and 31b opposed to each other are driven upward and downward to be separated from each other so that the gap between the pole pieces 31a and 31b is broadened. Then, the mold 20 for which the above closing step has been performed is placed in the gap.

Next, as shown in FIG. 7(b), the pole pieces 31a and 31b are driven upward and downward again to narrow the gap. Thus, the upper pole piece 31a closely contacts the upper surface of the lid portion 23 of the mold 20. Then, the lower pole piece 31b closely contacts the lower surface of the die 22 of the mold 20.

At this time, the mold 20 is placed such that the longitudinal direction of the cavity 21 is parallel with the pressurizing direction of each pressurizing cylinder (not shown) for driving the punch 24. Further, the mold 20 is placed such that the cavity 21 is located on a line connecting both pressurizing cylinders.

Thus, the placement of the mold 20 is completed.

Next, as shown in FIG. 7(c), both pressurizing cylinders (not shown) are driven to extend the pistons (not shown). Then, the pistons press the pressed portions 26 of both punches 24 from both sides. Then, the pressurizing portions 25 of both punches 24 slide in directions to approach each other in the cavity 21. Then, end surfaces of the pressurizing portions 25 horizontally pressurize the first magnetic powder 52a and the second magnetic powder 52b so as to be opposed to each other via a predetermined interval.

The step of the punches 24 pressurizing the magnetic powders 52 in the cavity 21 as described above is referred to as a pressurizing step.

At this time, the electromagnets 30a and 30b are not driven, so that a magnetic field is not applied to the first and second magnetic powders 52a and 52b in the cavity 21.

The first and second magnetic powders 52a and 52b are pressurized with a predetermined force by the punches 24. At this time, the loading density represented by "magnetic powder weight/cavity volume" is 3.0 g/cm^3 or smaller, or more preferably, 2.5 g/cm^3 or smaller and 2.0 g/cm^3 or greater.

In the case where the loading density is high, grains of the magnetic powder 52 are difficult to move due to friction thereamong when orientation by a magnetic field is performed later. As a result, the orientation degree (residual magnetic flux density of sintered permanent magnet 50/residual magnetic flux density of sintered magnet that has been ideally oriented along magnetic field direction) is deteriorated, whereby magnetic characteristics are deteriorated.

In the case where the loading density is low, e.g., smaller than 2.0 g/cm^3, the magnetic powder 52 aligned in the magnetic field direction is consolidated while moving, when being pressurized. Therefore, the magnetization direction of the permanent magnet powder is disordered, so that the orientation degree after the sintering is reduced.

Next, as shown in FIG. 7(*d*), the electromagnets 30*a* and 30*b* are driven to generate a magnetic field so that the magnetic field is applied to the magnetic powder 52 in the cavity 21 in a direction perpendicular to the longitudinal direction of the cavity 21. Thus, magnetic field orientation is performed so as to align the magnetization easy axis of the magnetic powder 52.

While the magnetic field is applied to the magnetic powder 52 to perform orientation, the magnetic powder 52 in the cavity 21 is further pressurized with a predetermined pressure by the punches 24. Thus, pressurized molding is performed in the magnetic field.

The step of performing magnetic field orientation by applying a magnetic field as described above is referred to as an orientation step.

In the present embodiment, as described above, a molding method in which the pressurizing step and the orientation step are combined is used.

Next, the driving of the electromagnets 30*a* and 30*b* is stopped. Thereafter, a magnetic field in which N pole and S pole are reversed is further applied to perform demagnetization. Thereafter, the pistons of both pressurizing cylinders are contracted to be separated from the mold 20.

It is noted that the pressurized molding in a magnetic field may use a fixed-pressure molding method in which pressurization is completed when a predetermined pressure is reached, or may use a fixed-position molding method in which pressurization is completed when the pressed portions 26 of both punches 24 are pushed to a predetermined position.

At this time, it is desirable that the density represented by permanent magnet molded product weight/permanent magnet molded product volume is 4 to 4.5 g/cm^3.

Next, although not shown, after the pressurized molding, the pole pieces 31*a* and 31*b* are driven upward and downward to be separated from the mold 20. Then, the mold 20 is removed from the gap between the pole pieces 31*a* and 31*b*.

Next, although not shown, the lid portion 23 of the mold 20 is detached, and then the molded body of the permanent magnet 50 is detached from the cavity 21.

Next, although not shown, in vacuum or in an inert gas atmosphere, the molded body of the permanent magnet 50 is thermally processed at about 1000 to 1100° C., whereby the molded body is contracted to be densified to about 7.5 g/cm^3.

Thus, in the sintered body of the permanent magnet 50, the first and second magnetic powders 52*a* and 52*b* are integrated by the sintering. This step is referred to as a sintering step.

The permanent magnet 50 thus molded has a structure in which the content rate of heavy rare earth element Dy is high in the corner portion 51 region where a high coercivity is needed because a demagnetization field from the stator 42 is particularly strongly applied, and the content rate of Dy is low or Dy does not exist in the other region.

Thus, the permanent magnet 50 in which the content rate of heavy rare earth element is partially high can be obtained.

The Nd—Fe—B based rare earth sintered magnet is formed by aggregate of a plurality of Nd2Fe14B phase (main phase) portions, and a grain boundary phase such as Nd oxide exists around the outer shell of the main phase.

In embodiment 1 of the present invention, since Dy for the corner portions (both end portions) of the permanent magnet 50 is added when the material alloy is produced, a heavy rare earth element such as Dy is not concentrated in the grain boundary phase, but light rare earth elements Nd and Pr in both of the main phase and the grain boundary phase are equally replaced with a heavy rare earth element. Therefore, there is no density distribution of heavy rare earth element inside the Nd2Fe14B crystal phase. It is noted that the same phenomenon occurs also in the following embodiments, and therefore the description thereof is omitted as appropriate.

It is noted that when the permanent magnet 50 is densified and contracted by sintering, the degree of contraction in the orientation direction is greater than that in a direction perpendicular to the orientation direction. Therefore, it is desirable that a region where the second magnetic powder 52*b* is loaded and the loading amount are adjusted considering a rate of contraction and a direction in which contraction is great in advance.

After the loading step, the orientation step, and the pressurizing step for the first magnetic powder 52*a* are performed, the loading step for the second magnetic powder 52*b* and the subsequent steps may be performed. In this case, in the molded permanent magnet 50, a difference in density occurs between the molded body of the first magnetic powder 52*a* and the molded body of the second magnetic powder 52*b*, whereby a crack can occur at the interface therebetween, and due to difference in contraction rate after sintering, shape distortion of the permanent magnet 50 becomes large. Therefore, it is preferable that the first magnetic powder 52*a* and the second magnetic powder 52*b* are simultaneously oriented and pressurized.

Figure 8:
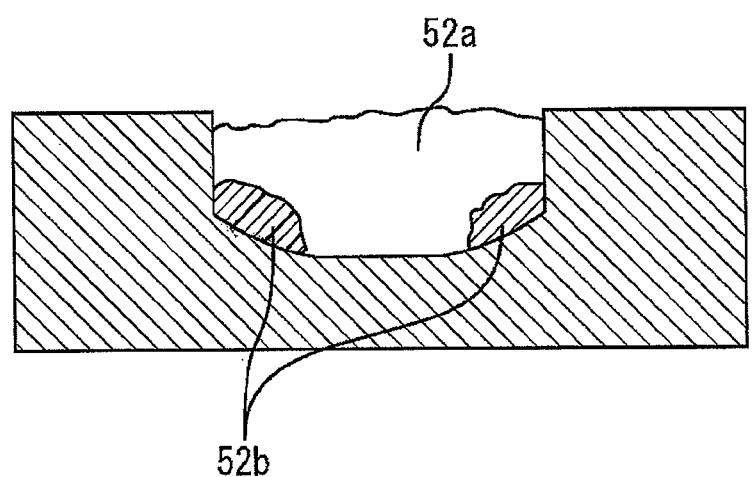
FIG. 8 is a sectional view showing another example of the shape of the mold according to embodiment 1 of the present invention.

FIG. 8 is a sectional view of the cavity 21 along the short-side direction, showing another example of the shape of the mold 20.

In the above, the order of steps is such that the second magnetic powder 52*b* is loaded after the first magnetic powder 52*a* is loaded. Instead of this order of steps, the first magnetic powder 52*a* may be loaded after the second magnetic powder 52*b* is loaded.

In this case, the second magnetic powder 52*b* is located at the bottom surface side in the cavity 21. Therefore, the shape of the bottom surface of the cavity 21 may be formed so as to correspond to the shape of the circumferential surface J of the permanent magnet 50.

In this case, for example, the shape of the bottom surface of the cavity 21 becomes a semicylindrical shape as shown in FIG. 8.

In addition, in order to load the second magnetic powder 52*b* more uniformly, the second magnetic powder 52*b* kneaded with a solvent such as an alcohol to be slurry may be used.

In the present embodiment, the second magnetic powder 52*b* is located at both ends of the circumferential surface of the permanent magnet 50. As another configuration of the permanent magnet 50, the second magnetic powder 52*b* may be located at only one of the corner portion 51 regions of the circumferential surface J.

In the production method for permanent magnet, the production device for permanent magnet, the permanent magnet and the rotating electrical device using the permanent magnet configured as described above according to the present embodiment, the cavity 21 in which the magnetic powder 52 is loaded is formed in a groove shape such that the longitudinal direction of the cavity 21 extends in the horizontal direction of the device 100. In this cavity 21, the first magnetic powder 52a and the second magnetic powder 52b having different content rates of heavy rare earth element are loaded. Therefore, a bridge, a void, or the like in the cavity 21 which could be caused when the first magnetic powder 52a and the second magnetic powder 52b are loaded therein can be prevented.

Particularly, the second magnetic powder 52b can be accurately and easily placed and loaded in the corner portion 51 region of the permanent magnet 50 where a high coercivity is required.

Thus, it becomes possible to provide a production method for permanent magnet, a production device for permanent magnet, a permanent magnet and a rotating electrical device using a permanent magnet so that the permanent magnet has an improved coercivity and an improved residual magnetic flux density and the use amount of a rare earth element therein is reduced.

In the case where the permanent magnet 50 is formed in a shape obtained by, for example, combining a cuboid portion and a semicylindrical portion, in a sectional area of the permanent magnet 50 cut along a plane perpendicular to the central shaft of the rotor 41, an area corresponding to the corner portions 51 (both end portions) of the circumferential surface J of the permanent magnet 50, where a particularly strong demagnetization field from the stator 42 is applied of a demagnetization field applied in parallel with the orientation direction of the permanent magnet 50, is 4 to 30% of the sectional area of the permanent magnet 50 which is defined as 100%. Further, the sectional area of one corner portion 51 (end portion) of the permanent magnet 50 where a particularly strong demagnetization field is applied is as very small as 2 to 15%. According to the present invention, the second magnetic powder 52b can be placed and loaded with a uniform loading density into an appropriate region even in the case where the region has such a small sectional area and a thin shape extending in the longitudinal direction of the permanent magnet 50.

Further, since the depth of the cavity 21 is shallow, the permanent magnet 50 can be prevented from having a density difference due to the magnetic powder 52 being densified by self-weight before orientation.

Therefore, in the permanent magnet 50, reduction in the orientation degree due to the density difference does not occur, and since contraction that uniforms the density difference after sintering can be suppressed, shape distortion is reduced.

As a result, in the permanent magnet 50, a cutting margin in mechanical work for shape finishing can be reduced, and further, the mechanical work for shape finishing can be even omitted.

Therefore, in the permanent magnet 50, the use amount of a rare earth element can be further reduced, and the cost of mechanical work can be also reduced.

The first and second magnetic powders 52a and 52b are molded in the same mold 20. Therefore, pressurizing forces (molding pressures) applied to the first and second magnetic powders 52a and 52b are the same. In addition, the first and second magnetic powders 52a and 52b are integrated in close contact with each other in molding. Therefore, the contraction degrees of the first and second magnetic powders 52a and 52b in sintering become the same and can be accurately integrated.

Therefore, not only in the case where the permanent magnet 50 is desired to have a simple shape such as a plate-like sectional shape (rectangular sectional shape) but also in the case where the permanent magnet 50 is desired to have a complicated shape such as a shape obtained by combining a cuboid portion and a semicylindrical portion or an arc-plate sectional shape, the second magnetic powder 52b with a high content rate of heavy rare earth element can be selectively placed, at both end portions (corner portions 51) in the width direction of the permanent magnet 50 which corresponds to the rotation direction when the permanent magnet 50 is attached to the rotor 41, in the circumferential surface J of the permanent magnet 50 facing the stator 42, and the vicinity thereof.

Further, the second magnetic powder 52b can be directly loaded on the first magnetic powder 52a without using a partition or the like for dividing the cavity 21. Therefore, risk of occurrence of distortion, crack, fracture, or the like due to a loading density difference between the first magnetic powder 52a and the second magnetic powder 52b is reduced.

In a conventional production device, since a mold is integrally incorporated in the device, operations of "when a permanent magnet is molded, taking out the permanent magnet from the mold, and then loading a magnetic powder into a vacant cavity" are alternately repeated, whereby molded products of permanent magnets are sequentially produced. Therefore, while a magnetic powder is being loaded into the mold, an orientation operation and a press working operation need to be interrupted, so that the productivity reduces. However, in the present invention, the mold 20 is detachable from the device 100. Therefore, while the magnetic powder 52 is being loaded into the mold 20, the permanent magnet 50 can be molded by another mold 20, whereby the productivity is improved as compared to a conventional permanent magnet device.

The loading step is performed with the mold 20 separated from the device 100. Therefore, a loading mechanism portion needed for the loading work can be provided without space restriction. Therefore, distribution of the loading density of the magnetic powder 52 in the cavity 21 can be further suppressed, and the loading density in the horizontal direction of the magnetic powder 52 in the cavity 21 can be further uniformed.

If plural kinds of molds are prepared and then a mold to be used and loading amounts of magnetic powders having plural kinds of compositions, to be loaded, are changed, piece-by-piece production can be easily performed in accordance with individual amounts of heavy rare earth element, distributions of heavy rare earth element, and shapes of permanent magnets. Thus, various-kind and various-amount production can be easily performed.

The loading step does not need to be performed at a place where a magnetic field is applied. Therefore, the loading step can be prevented from being disturbed by the magnetic powder 52 being adhered to the mold 20 due to magnetization remaining in the mold 20 or ferromagnetic members such as the pole pieces 31a and 31b. In addition, variation in the loading amount of the magnetic powder 52 in the mold 20 due to magnetization, and variation in the magnetic characteristics of the permanent magnet 50 due to unevenness of the loading density, can be prevented.

The mold 20 is formed by a nonmagnetic member, so that magnetization by a magnetic field does not remain therein. Therefore, the magnetic powder 52 can be further prevented from being adhered to the mold 20 when the magnetic powder 52 is loaded.

A ferromagnetic mechanism portion such as the pole pieces 31a and 31b does not exist around the cavity 21 in loading work. Therefore, the magnetic powder 52 can be prevented from being adhered to the pole pieces 31a and 31b or the like. Thus, the use amount of a rare earth element can be reduced to a minimum necessary amount.

Embodiment 2

Hereinafter, with reference to the drawings, embodiment 2 of the present invention will be described focusing on a part different from embodiment 1.

In the drawings used in the present embodiment, the same components as in the above embodiment 1 are denoted by the same reference characters, and the description thereof is omitted.

In embodiment 1, one lid portion is used for closing the cavity 21. On the other hand, in the present embodiment, two kinds of lid portions whose molding portions have different shapes are used.

Figure 9:
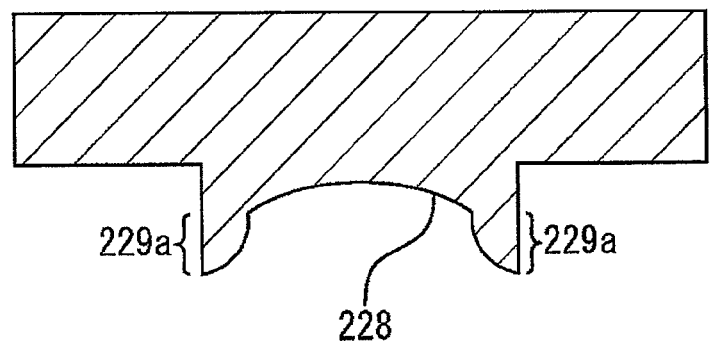
FIG. 9 is a sectional view showing the shape of a lid portion according to embodiment 2 of the present invention.
Figure 9:
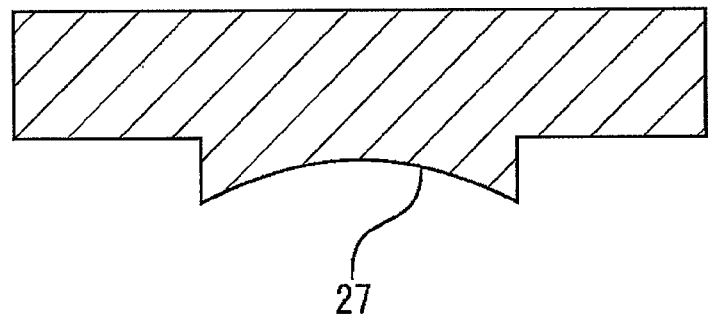

FIG. 9 is sectional views of lid portions along the short-side direction, showing the shapes of a first lid portion 223a and a second lid portion 223b in the present embodiment.

Figure 10:
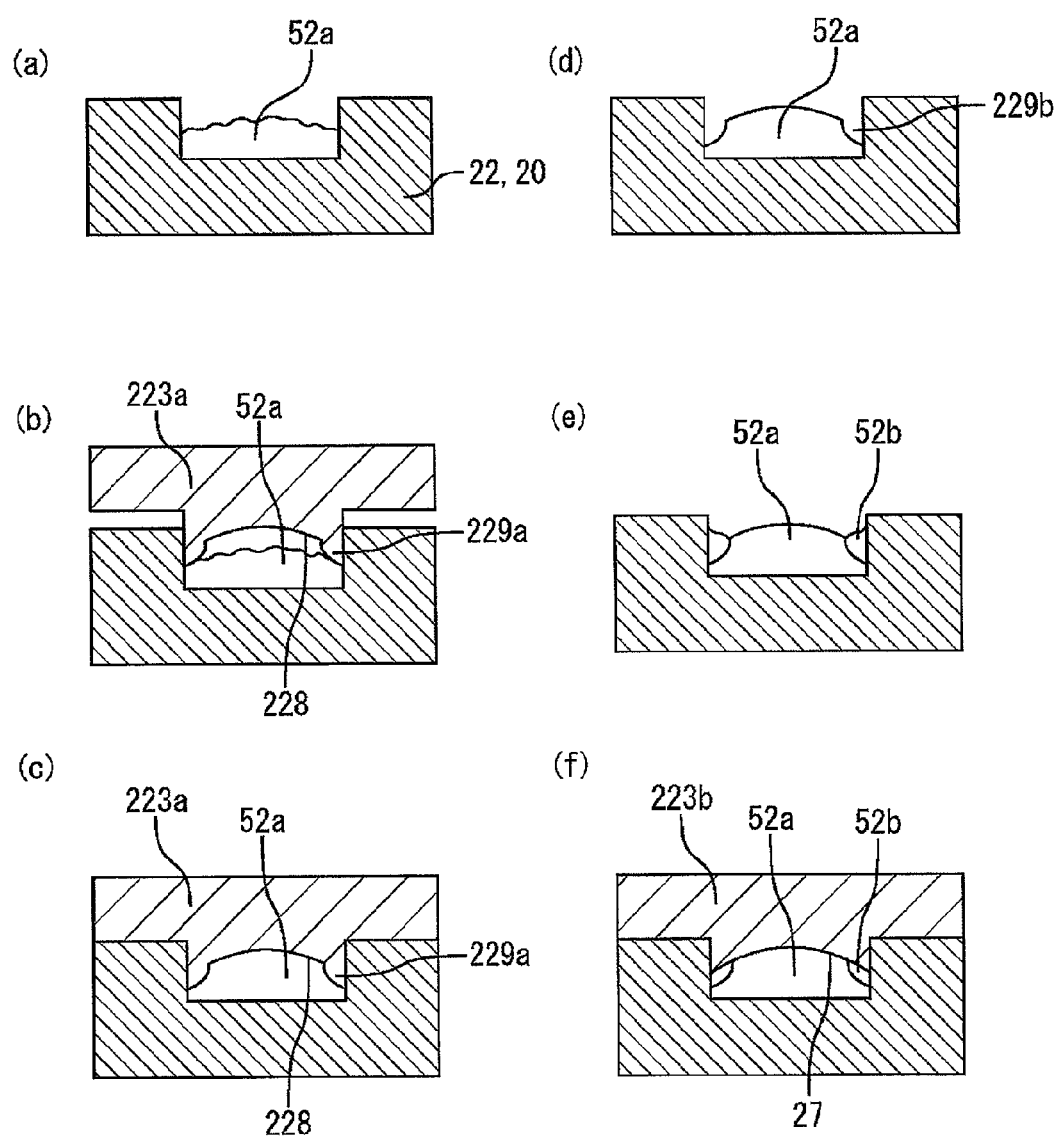
FIG. 10 is a sectional view of a production device for permanent magnet, showing a process for loading a magnetic powder in the production device for permanent magnet, according to embodiment 2 of the present invention.

FIG. 10 is sectional views showing a process for loading the first and second magnetic powders 52a and 52b.

The first lid portion 223a has a preliminary molding portion 228 with protrusions 229a formed at predetermined positions, which protrude toward the cavity 21 side.

In the present embodiment, the predetermined positions are regions extending along the longitudinal inner walls of the cavity 21.

The second lid portion 223b has the same shape as the lid portion 23 used in embodiment 1.

Next, a method for producing a permanent magnet using the first lid portion 223a and the second lid portion 223b will be described with reference to FIG. 10.

First, as in the first loading step in embodiment 1, the first magnetic powder 52a by a predetermined weight is loaded into the cavity 21 (FIG. 10(a)).

Next, as shown in FIG. 10(b), the cavity 21 is lidded being covered by the first lid portion 223a, whereby the cavity 21 is closed, and the first magnetic powder 52a in the cavity 21 is depressed by the preliminary molding portion 228 of the first lid portion 223a. Thus, the shape of the preliminary molding portion 228 is transferred and dents 229b having shapes corresponding to the protrusions 229a are formed in the first magnetic powder 52a (FIG. 10(c)).

The dents 229b are formed in a groove shape on the first magnetic powder 52a so as to extend along the longitudinal inner walls of the cavity 21.

The above step of performing processing from the state in FIG. 10(a) to the state in FIG. 10(c) is referred to as a first closing step.

Next, although not shown, the pressed portions 26 of both punches 24 are pressed from both sides of the cavity 21, whereby the loading density of the first magnetic powder 52a is increased to 2 to 2.5 g/cm^3.

Next, as shown in FIG. 10(d), the first lid portion 223a is removed.

Next, as shown in FIG. 10(e), as in the second loading step in embodiment 1, the second magnetic powder 52b is loaded at a predetermined position in the cavity 21.

The predetermined position is a region extending along the longitudinal inner wall of the cavity 21. That is, in the present embodiment, the predetermined position is a region in each dent 229b on the first magnetic powder 52a.

Next, as shown in FIG. 10(f), the cavity 21 is lidded being covered by the second lid portion 223b, whereby the cavity 21 is closed, and the first magnetic powder 52a and the second magnetic powder 52b in the cavity 21 are depressed by the molding portion 27 of the second lid portion 223b, whereby the shape of the molding portion 27 is transferred and the first magnetic powder 52a and the second magnetic powder 52b are molded.

The above step of performing processing from the state in FIG. 10(e) to the state in FIG. 10(f) is referred to as a second closing step.

The production method for permanent magnet, the production device for permanent magnet, the permanent magnet and the rotating electrical device using the permanent magnet configured as described above according to the present embodiment provide the following effect, as well as the same effect as in the above embodiment 1. That is, the region where the second magnetic powder 52b is loaded and the region where the first magnetic powder 52a is loaded are clearly divided. Therefore, the second magnetic powder 52b can be accurately and easily loaded into a region where a particularly strong demagnetization field is applied from the stator 42.

Thus, it becomes possible to provide a production method for permanent magnet, a production device for permanent magnet, a permanent magnet and a rotating electrical device using a permanent magnet so that the permanent magnet has a further improved balance between the coercivity and the residual magnetic flux density and the use amount of a heavy rare earth element therein is further reduced.

Further, since the second magnetic powder 52b does not invade the region of the first magnetic powder 52a, the use amount of a heavy rare earth element can be further reduced.

Embodiment 3

Hereinafter, with reference to the drawings, embodiment 3 of the present invention will be described focusing on a part different from embodiments 1 and 2.

In the drawings used in the present embodiment, the same components as in the above embodiments 1 and 2 are denoted by the same reference characters, and the description thereof is omitted.

Figure 11:
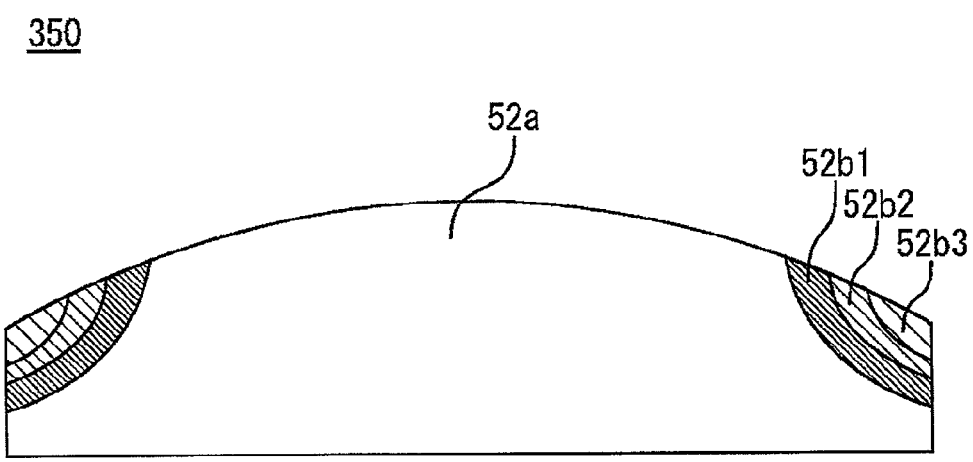
FIG. 11 is a sectional view showing the structure of a permanent magnet according to embodiment 3 of the present invention.

FIG. 11 is a sectional view along the short-side direction, showing the configuration of a permanent magnet 350 of the present embodiment.

In the present embodiment, the permanent magnet 350 is produced which is composed of a plurality of second magnetic powders 52b1, 52b2, and 52b3 having different content rates of heavy rare earth element in accordance with the strengths of a demagnetization field from the stator 42.

Of the plurality of second magnetic powders used in the present embodiment, the second magnetic powder 52b3 has the highest content rate of heavy rare earth element such as Dy or Tb, and the second magnetic powder 52b1 has the lowest content rate of heavy rare earth element.

As shown in FIG. 11, in the permanent magnet 350, the closer to an end of the circumferential surface J, the higher the content rate of heavy rare earth element is.

Next, a method for producing the permanent magnet 350 will be described.

First, as in the first loading step (FIG. 6(b)) of embodiment 1, the first magnetic powder 52a by a predetermined weight is loaded into the cavity 21.

Next, in the second loading step (FIG. 6(c)), the second magnetic powder 52b1 having the lowest content rate of heavy rare earth element is loaded at a predetermined position in the cavity 21, then, the second magnetic powder 52b2 is loaded to overlay the second magnetic powder 52b1, and finally, the second magnetic powder 52b3 having the highest content rate of heavy rare earth element is loaded.

Thus, in the second loading step of the present embodiment, loading of the second magnetic powders is performed in order from the second magnetic powder with the lowest content rate of heavy rare earth element, thereby producing the permanent magnet 350.

Of the second magnetic powders composing the permanent magnet 350 thus produced, the loading amount (mass) of the second magnetic powder 52b3 having the highest content rate of heavy rare earth element is the smallest, the loading amount (mass) of the second magnetic powder 52b2 is the second smallest, and the loading amount (mass) of the second magnetic powder 52b1 having the lowest content rate of heavy rare earth element is the largest.

Thus, the second magnetic powders having coercivities in accordance with the strengths of the applied demagnetization field can be properly placed at portions in accordance with the strengths of the applied demagnetization field. Therefore, it becomes possible to further improve the balance between the coercivity and the residual magnetic flux density and further reduce the use amount of a heavy rare earth element.

Further, by changing the loading amounts of the plural kinds of second magnetic powders 52b1, 52b2, and 52b3 while using a single mold 20 as described above, permanent magnets with various heavy rare earth distributions can be easily produced. Therefore, the production cost can be reduced.

In the case of clarify the boundaries among the loaded regions of the plurality of second magnetic powders, a lid portion having a preliminary molding portion as described in embodiment 2 may be used.

In this case, using a plurality of lid portions having preliminary molding portions with shapes corresponding to the loaded regions of the second magnetic powders 52b1, 52b2, and 52b3, every time each of the second magnetic powders 52b1, 52b2, and 52b3 is loaded into the cavity 21, the shape of the corresponding preliminary molding portion is transferred.

Thus, the plurality of second magnetic powders can be prevented from invading each other's region. Therefore, the use amount of a rare earth element can be further reduced.

The production method for permanent magnet, the production device for permanent magnet, the permanent magnet and the rotating electrical device using the permanent magnet configured as described above according to the present embodiment, as well as providing the same effects as in the above embodiments 1 and 2, can provide a production method for permanent magnet, a production device for permanent magnet, a permanent magnet and a rotating electrical device using a permanent magnet so that the permanent magnet has a further improved balance between the coercivity and the residual magnetic flux density and the use amount of a rare earth element therein is further reduced.

In addition, in the permanent magnet for rotating electrical device thus formed by an R-T-B based rare earth magnet and placed in the rotating electrical device in the present embodiment, the density of a heavy rare earth element at both corner portions in the rotation direction of the permanent magnet in the circumferential surface facing the stator of the rotating electrical device is higher than the density of a heavy rare earth element at the other part, the density of a heavy rare earth element continuously decreases from both corner portions toward the central portion, and the density of a heavy rare earth element inside an R2T14B crystal phase is uniformly distributed.

Embodiment 4

Hereinafter, with reference to the drawings, embodiment 4 of the present invention will be described focusing on a part different from embodiment 1.

In the drawings used in the present embodiment, the same components as in the above embodiment 1 are denoted by the same reference characters, and the description thereof is omitted.

Figure 12:
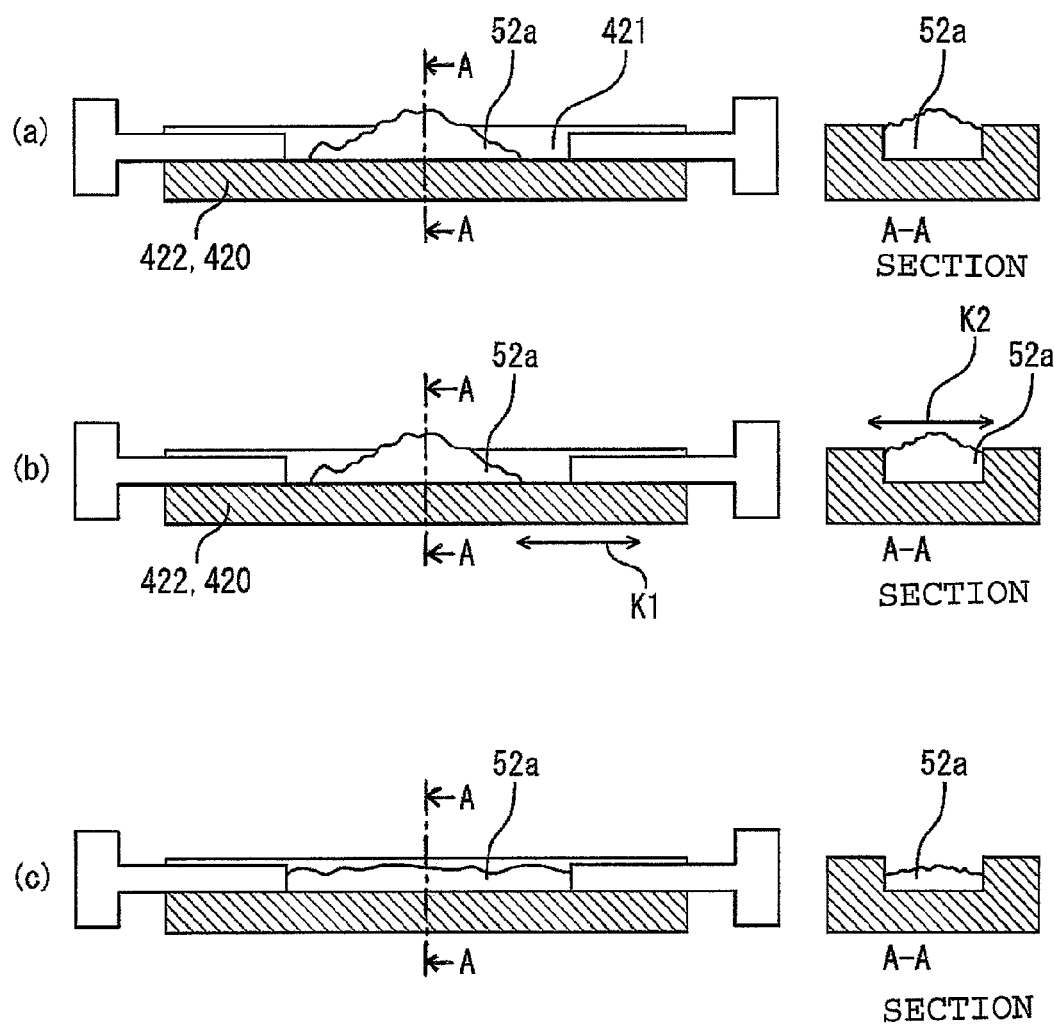
FIG. 12 is a sectional view of a production device for permanent magnet, showing a mold and a magnetic powder in a cavity, according to embodiment 4 of the present invention.

FIG. 12 is sectional views of a cavity 21 along the longitudinal direction and the short-side direction, showing a mold 420 and a magnetic powder in the cavity 421 in the present embodiment.

In the present embodiment, a swing portion (not shown) capable of swinging a die 422 of the mold 420 is provided.

The swing portion is capable of swinging the die 422 in both of the longitudinal direction and the short-side direction of the cavity 421.

A process for loading a magnetic powder using the swing portion will be described.

First, as shown in FIG. 12(a), the first loading step is performed as in embodiment 1, to load the first magnetic powder 52a into the cavity 21.

At this time, as shown in FIG. 12(a), the first magnetic powder 52a is loaded in a mountain-like shape so as to be heaped upward partially in the cavity 421.

Next, as shown in FIG. 12(b), the die 422 is swung by the swing portion.

By swing K1 of the die 422 in the longitudinal direction of the cavity 421, the first magnetic powder 52a in a state shown in the left diagram of FIG. 12(b) is flattened in the longitudinal direction of the cavity 421 as shown in the left diagram of FIG. 12(c).

In addition, by swing K2 of the die 422 in the short-side direction of the cavity 421, the first magnetic powder 52a in a state shown in the right diagram of FIG. 12(b) is flattened in the short-side direction of the cavity 421 as shown in the right diagram of FIG. 12(c).

Although not shown, for example, after the second magnetic powder 52b is loaded, the die 422 may be swung only in the longitudinal direction of the cavity 421, whereby the second magnetic powder 52b may be placed so as to extend along the longitudinal inner wall of the cavity 21.

The above step from the state in FIG. 12(b) to the state in FIG. 12(c) is referred to as a swing step.

The production method for permanent magnet, the production device for permanent magnet, the permanent magnet and the rotating electrical device using the permanent magnet configured as described above according to the present embodiment, as well as providing the same effect as in the above embodiment 1, can load the magnetic powder 52 uniformly throughout the cavity 421 by swinging the die 422 even if the magnetic powder 52 has not been uniformly loaded in the cavity 21 in the loading step.

Thus, it becomes possible to provide a production method for permanent magnet, a production device for permanent magnet, a permanent magnet and a rotating electrical device using a permanent magnet so that the permanent magnet has a further improved balance between the coercivity and the residual magnetic flux density and the use amount of a rare earth element therein is further reduced.

Embodiment 5

Hereinafter, with reference to the drawings, embodiment 5 of the present invention will be described focusing on a part different from embodiment 1.

In the drawings used in the present embodiment, the same components as in the above embodiment 1 are denoted by the same reference characters, and the description thereof is omitted.

Figure 13:
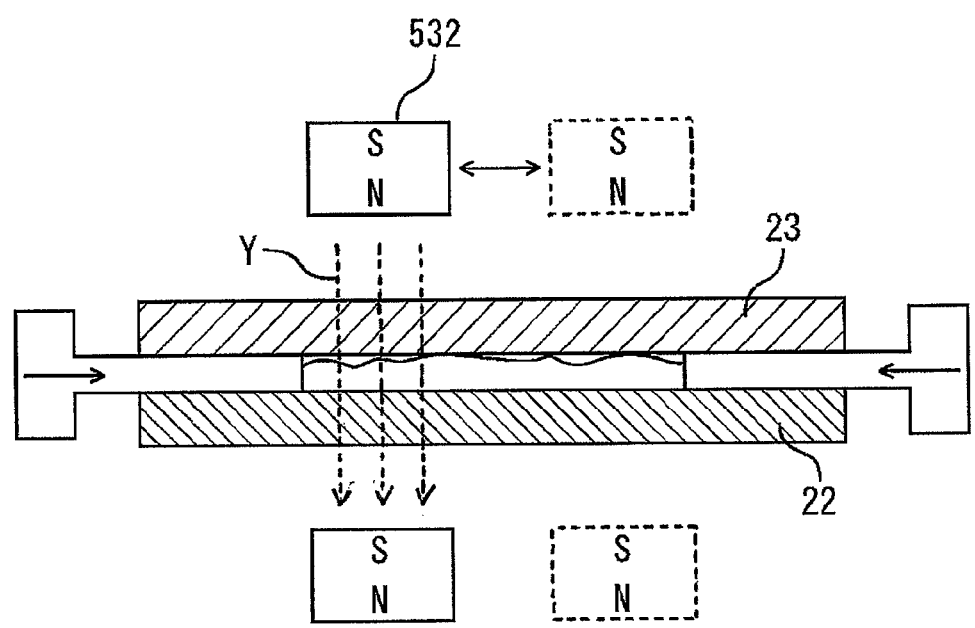
FIG. 13 is a sectional view of a production device for permanent magnet, showing a cavity and a magnet, according to embodiment 5 of the present invention.

FIG. 13 is a sectional view showing the cavity 21 and magnets 532 in the present embodiment.

In the present embodiment, the magnets 532 movable in the horizontal direction are provided above and below the cavity 21.

The magnet 532 is a ferrite magnet, an SmCo (samarium-cobalt) magnet, an Nd—Fe—B based magnet, or the like having a smaller size than that of the cavity 21.

Hereinafter, a production method for permanent magnet using the magnet 532 will be described.

First, as in embodiment 1, the magnetic powder 52 is loaded into the cavity 21 in the loading step (FIG. 6(b)).

Next, as in embodiment 1, the cavity 21 is closed in the closing step (FIG. 6(d)).

Next, as shown in FIG. 13, in the state in which the magnet 532 is located close to the upper surface of the lid portion 23 or the lower surface of the die 22, a weak magnetic field Y indicated by a dot line is applied to the magnetic powder 52 in a region smaller than the size of the cavity 21, and then the magnetic field is moved while the magnet 532 is swung in the horizontal direction, whereby the magnetic powder 52 can be agitated and loaded uniformly.

The above step is referred to as a magnetic field agitation step.

Further, if the pressurizing step described in embodiment 1 and the swing step described in embodiment 4 are combined with the magnetic field agitation step of the present embodiment, the magnetic powder 52 can be loaded further uniformly.

In this case, in the state in which the magnet 532 is located close to the upper surface of the lid portion 23 or the lower surface of the die 22, while the die 22 is swung in the horizontal direction in the swing step, a weak magnetic field is applied to the magnetic powder 52 in a region smaller than the size of the cavity 21, whereby the magnetic powder 52 is agitated.

Further, in the pressurizing step, the pressurizing portions 25 of both punches 24 are moved to approach each other, and while the inside of the cavity 21 is thus gradually narrowed, the above magnetic field agitation step is performed, whereby the loading can be performed further uniformly.

In the pressurizing step, it is preferable to adjust the positions of both punches 24 so that the value of "mass of loaded magnetic powder 52/cavity volume" is within a range of 2.0 to 3.0 g/cm^3.

The production method for permanent magnet, the production device for permanent magnet, the permanent magnet and the rotating electrical device using the permanent magnet configured as described above according to the present embodiment, as well as providing the same effect as in the above embodiment 1, apply a weak magnetic field to the cavity 21 and move the magnetic field to agitate the magnetic powder 52 in the cavity 421, thereby loading the magnetic powder 52 uniformly throughout the cavity 421.

Thus, it becomes possible to provide a production method for permanent magnet, a production device for permanent magnet, a permanent magnet and a rotating electrical device using a permanent magnet so that the permanent magnet has a further improved balance between the coercivity and the residual magnetic flux density and the use amount of a rare earth element therein is further reduced.

Embodiment 6

Hereinafter, embodiment 6 of the present invention will be described focusing on a part different from embodiment 1.

The same components as in the above embodiment 1 are denoted by the same reference characters, and the description thereof is omitted.

In the present embodiment, a nonmagnetic rod portion is provided.

Hereinafter, a production method for permanent magnet using the rod portion will be described.

After the loading step (FIG. 6(b)) in embodiment 1 is performed, a nonmagnetic rod portion 600 is inserted into the cavity 21, and the magnetic powder 52 in the cavity 21 is agitated by the rod portion 600.

This step is referred to as a rod agitation step.

Thus, the magnetic powder 52 can be uniformly loaded into the cavity.

The production method for permanent magnet, the production device for permanent magnet, the permanent magnet and the rotating electrical device using the permanent magnet configured as described above according to the present embodiment, as well as providing the same effect as in the above embodiment 1, agitate the magnetic powder 52 in the cavity 21 by the rod portion 600, thereby loading the magnetic powder 52 uniformly throughout the cavity 21.

Thus, it becomes possible to provide a production method for permanent magnet, a production device for permanent magnet, a permanent magnet and a rotating electrical device using a permanent magnet so that the permanent magnet has a further improved balance between the coercivity and the residual magnetic flux density and the use amount of a rare earth element therein is further reduced.

In addition, since the rod portion 600 is nonmagnetic, the magnetic powder 52 can be prevented from being adhered to the rod portion 600, whereby the use amount of a rare earth element can be reduced.

Embodiment 7

First, with reference to the drawings, the configurations of the permanent magnet 50 and the rotating electrical device 40 formed using the permanent magnet 50, according to embodiment 7 of the present invention, will be described.

Figure 14:
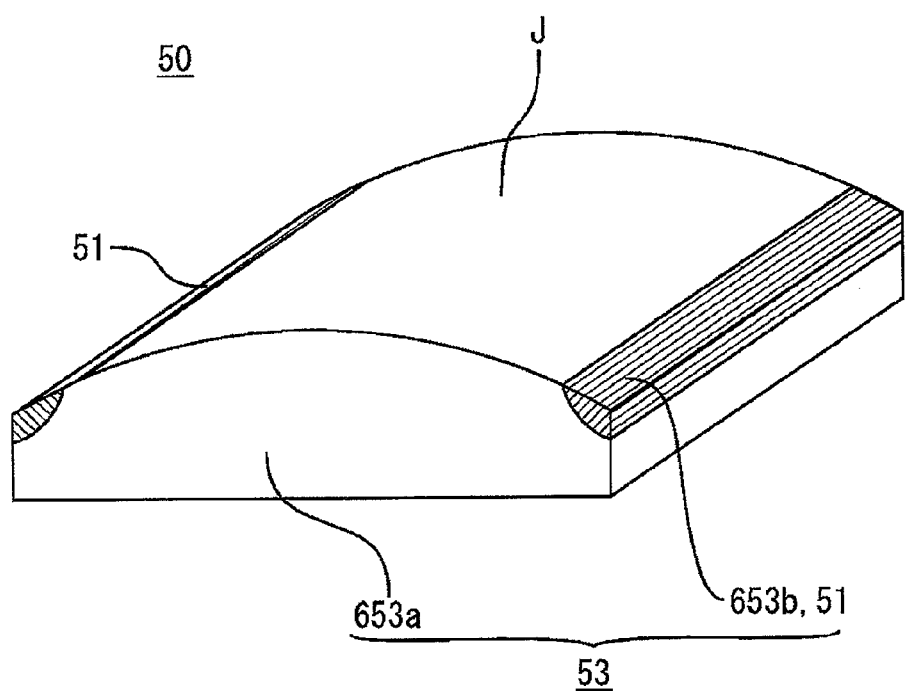
FIG. 14 is a perspective view showing the structure of a permanent magnet of a permanent magnet rotating electrical device according to embodiment 7 of the present invention.

FIG. 14 is a perspective view of the permanent magnet 50 used in the rotating electrical device 40.

Figure 15:
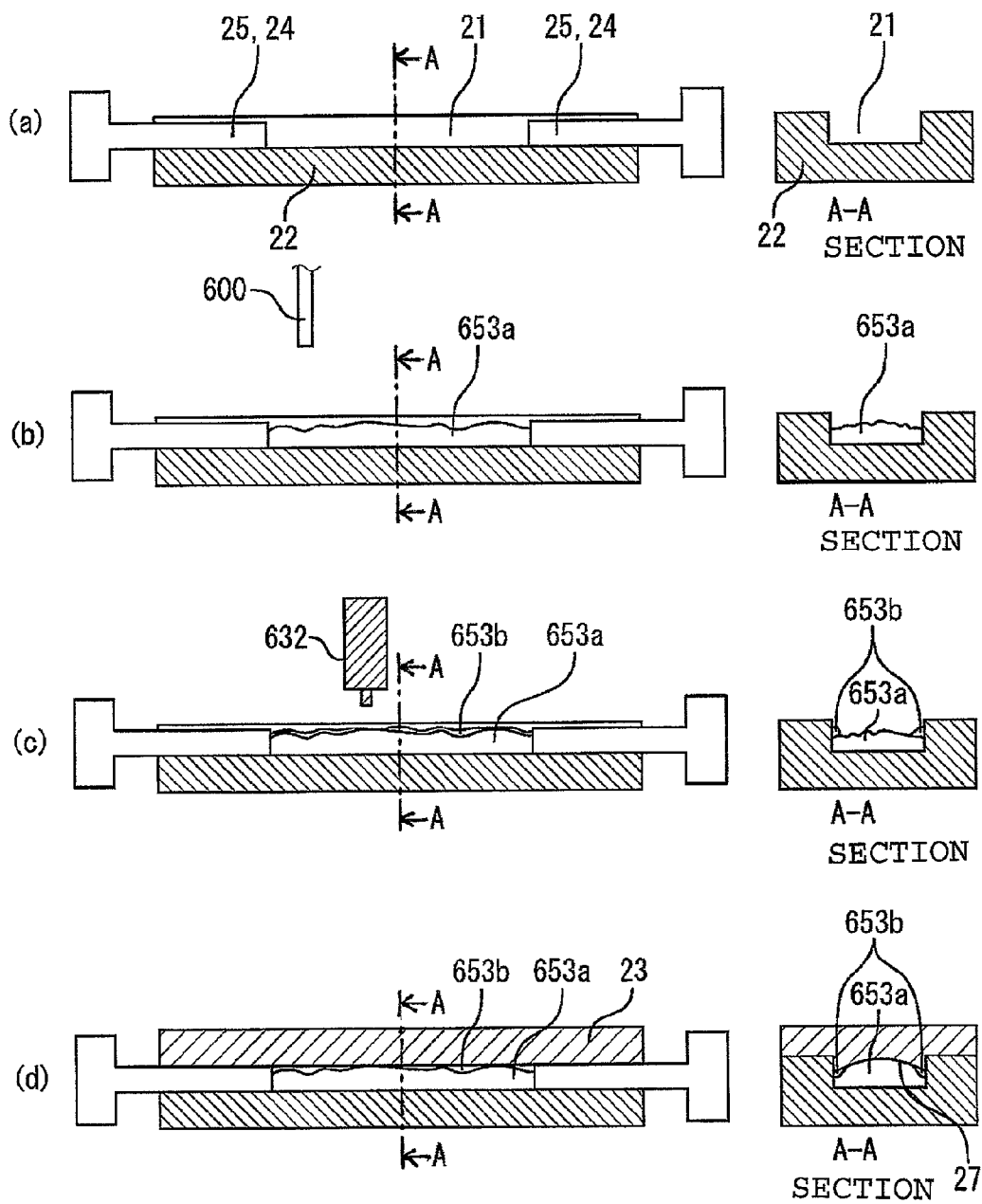
FIG. 15 is a sectional view of the production device for permanent magnet, showing a process for loading a permanent magnet material in the production device for permanent magnet, according to embodiment 7 of the present invention.

FIG. 15 is sectional views of the cavity 21 along the longitudinal direction and the short-side direction, showing a process for loading a first permanent magnet material 653a and a second permanent magnet material 653b into the cavity 21 formed by the mold 20.

The configuration of the rotating electrical device 40 is the same as that shown in FIG. 3 as in the above embodiments, so the description thereof is omitted. The configuration of the rotor 41 is the same as that shown in FIG. 4 as in the above embodiments, so the description thereof is omitted.

As shown in FIG. 14, the permanent magnet 50 has a shape obtained by combining a cuboid portion having a bottom surface and front, rear, right, and left surfaces, and a semicylindrical portion having a top surface (hereinafter, referred to as a circumferential surface).

As shown in FIG. 3, each permanent magnet 50 is placed in the rotor 41 such that the longitudinal direction of the permanent magnet 50 extends in the axial direction of the rotating electrical device 40. In this case, a shaded portion of the permanent magnet 50 shown in FIG. 14 (hereinafter, referred to as a corner portion 51) is a portion subjected to a particularly great demagnetization field from the stator 42 when the rotating electrical device 40 is driven.

As shown in FIG. 4, the corner portions 51 are both end regions of the circumferential surface J of the permanent magnet 50 in the direction in which the rotor 41 is rotated by a magnetic field from the stator 42.

Here, a material of the permanent magnet 50 will be described.

A material prepared from a permanent magnet material alloy is referred to as a permanent magnet material 53.

Further, of the permanent magnet material 53, an Nd—Fe—B based permanent magnet material 53 in a powder state having a composition containing no heavy rare earth element 654 such as Dy or Tb or slightly containing a heavy rare earth element 654 such as Dy or Tb is referred to as the first permanent magnet material 653a.

The permanent magnet 50 shown in FIG. 14 is formed by the first permanent magnet material 653a and the second permanent magnet material 653b. The second permanent magnet material 653b forming the corner portion 51 contains, through a production process described later, a larger amount of heavy rare earth element 654 than in the other region of the permanent magnet 50, i.e., the first permanent magnet material 653a.

That is, in the permanent magnet 50, the corner portion 51 region shown as a shaded portion in FIG. 14 contains a large amount of heavy rare earth element 654, and the other white region contains no heavy rare earth element 654 or slightly contains the heavy rare earth element 654 such as Dy or Tb.

Next, the configuration of the device 100 for producing the permanent magnet 50 is the same as that shown in FIG. 1 as in the above embodiments, so the description thereof is omitted.

In addition, the configuration of the mold 20 is the same as that shown in FIG. 2 as in the above embodiments, so the description thereof is omitted.

As shown in FIG. 15(c), an ejection portion 632 capable of ejecting the permanent magnet material 653 in a slurry state to a desired position in the cavity 21 is provided above the cavity 21.

Next, a method for producing the permanent magnet 50 using the device 100 will be described.

First, as the permanent magnet material 53, the first permanent magnet material 653a which has a composition containing no heavy rare earth element 654 such as Dy or Tb or slightly containing the heavy rare earth element 654 such as Dy or Tb as described above is prepared. Besides, the second permanent magnet material 653b which has a composition mainly composed of the heavy rare earth element 654 is prepared.

At the beginning, a process for preparing the first permanent magnet material 653a will be described.

A material alloy for permanent magnet powder is prepared which is composed of a light rare earth element by 1.5 mass %, B (boron) by 0.5 to 1.5 mass %, and the balance of Fe and inevitable impurity.

In embodiment 7 of the present invention, a strip casting method is used in which, under argon gas atmosphere, heating is performed at about 1500° C., to obtain a molten metal by high-frequency melting, and then the molten metal is rapidly cooled by a single roll method, to produce a scale-like alloy having a plate thickness of about 0.3 mm.

Thereafter, the material alloy for permanent magnet powder is thermally processed in a hydrogen furnace, thus being subjected to hydrogen embrittlement. At this time, the material alloy for permanent magnet powder is fractured into pieces with sizes of about 0.1 to several mm, thus becoming a coarse powder.

Further, the coarse powder for permanent magnet is put into a jet mill crushing device, to be pulverized into a size of 0.1 to 15 µm, generally, a size of about 3.5 µm, thus obtaining the first permanent magnet material 653a.

It is noted that the first permanent magnet material 653a may contain the heavy rare earth element 654 or may not contain the heavy rare earth element 654, and may have such a coercivity that, in a region inside the permanent magnet 50 where a demagnetization field from the stator 42 is weak, the permanent magnet 50 is not be demagnetized by the demagnetization field.

Next, a process for preparing the second permanent magnet material 653b will be described.

First, a powder of the heavy rare earth element 654 such as Dy or Tb is prepared.

Then, this powder is kneaded with an alcohol solvent, whereby the second permanent magnet material 653b in a slurry state is prepared.

As a solvent to be added to the powder of the heavy rare earth element 654, an organic solvent other than an alcohol solvent may be used.

Thus, the second permanent magnet material 653b having a composition mainly composed of the heavy rare earth element 654 has a coercivity so sufficient that the second permanent magnet material 653b is not demagnetized even by a strong demagnetization field from the stator 42.

Next, a method for producing the permanent magnet 50 using the first permanent magnet material 653a and the second permanent magnet material 653b will be described with reference to the drawings.

First, as shown in FIG. 1 and FIG. 15(a), before the mold 20 is placed in the gap between the pole pieces 31a and 31b, the lid portion 23 is detached, and the length of the cavity 21 formed by the pressurizing portions 25 of both punches 24 being separated from each other is set to be about two or three times the longitudinal dimension of the permanent magnet 50.

Next, as shown in FIG. 15(b), the first permanent magnet material 653a by a predetermined weight is loaded into the cavity 21.

At this time, the first permanent magnet material 653a is loaded so as to fill the cavity 21, while being uniformed throughout the cavity 21.

The above loading step of performing processing from the state in FIG. 15(a) to the state in FIG. 15(b) is referred to as a first loading step.

Next, as shown in FIG. 15(c), from the ejection portion 632, the second permanent magnet material 653b is loaded at a predetermined position in the cavity 21.

The predetermined position is a region corresponding to a portion of the molded permanent magnet 50 where an especially high coercivity is required.

For example, in the present embodiment, in the case of molding the permanent magnet 50 whose sectional shape is a rectangular shape, a shape obtained by combining a cuboid portion and a semicylindrical portion, or an arc-plate shape, the region where a high coercivity is required because a demagnetization field from the stator 42 is particularly strongly applied thereto is both end regions (corner portions 51 previously shown in FIG. 14) of the circumferential surface J of the permanent magnet 50.

In order to enhance the coercivity of the corner portion 51, as the predetermined position, the second permanent magnet material 653b is loaded at a position that is on the first permanent magnet material 653a loaded in the cavity 21 and extends along the longitudinal inner wall of the cavity 21.

The loading step of performing processing from the state in FIG. 15(b) to the state in FIG. 15(c) is referred to as a second loading step.

Figure 16:
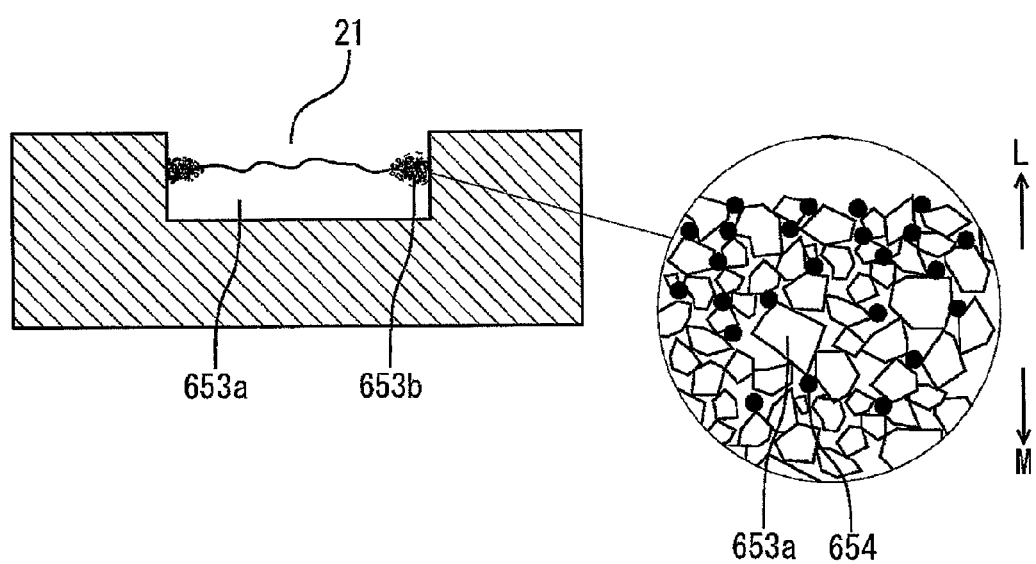
FIG. 16 is an enlarged view showing a cross section of a mold according to embodiment 7 of the present invention.

FIG. 16 is an enlarged sectional view along the longitudinal direction of the vicinity of the inner wall of the cavity 21 in a state shown in FIG. 15(c).

As described above, the first permanent magnet material 653a is in a powder state, and the first permanent magnet material 653a loaded in the first loading step has not been pressurized or sintered yet. Therefore, the powder density is sparse.

On the other hand, as described above, the second permanent magnet material 653b is prepared in a slurry state by kneading the heavy rare earth element 654 with an alcohol solvent. Therefore, when the slurry second permanent magnet material 653b is loaded on such a first permanent magnet material 653a with a sparse powder density, the alcohol solvent of the second permanent magnet material 653b penetrates into gaps among powder grains of the first permanent magnet material 653a.

Then, as shown in FIG. 16, by this penetration, the heavy rare earth element 654 such as Dy or Db is conveyed into the gaps among powder grains of the first permanent magnet material 653a, to be interposed in the gaps.

Thus, the first permanent magnet material 653a forming the corner portion 51 contains a larger amount of heavy rare earth element 654 than in the other region of the permanent magnet 50.

Since the power density of the first permanent magnet material 653a is sparse as described above, the penetration speed of the alcohol solvent is fast, and the rare earth element can be diffused to a desired depth in a short time.

Here, the heavy rare earth element 654 in the second permanent magnet material 653b is diffused toward the bottom of the cavity 21 while being interposed among the power grains of the first permanent magnet material 653a through the penetration of the alcohol solvent.

Therefore, the density of the heavy rare earth element 654 of the second permanent magnet material 653b becomes lower at a position closer to the bottom of the cavity 21.

Thus, from an opening side L toward a bottom side M of the cavity 21, the content rate of heavy rare earth element 654 decreases.

In the permanent magnet 50, a part where a high coercivity is needed because a demagnetization field from the stator is particularly strongly applied is the vicinity of the surface of the permanent magnet 50, and an influence of the demagnetization field becomes weaker at a deeper part of the permanent magnet.

Therefore, such a distribution of the heavy rare earth element 654 is appropriate to the magnitude of the influence of the demagnetization field.

In the above loading step, an opening region of the cavity 21 through which the permanent magnet material 53 is put is a strip-like region having the longitudinal length (indicated by B in FIG. 2) of the cavity 21 and the short-side length (indicated by C in FIG. 2) of the cavity 21, when the cavity 21 is seen from above in the vertical direction.

Thus, since the opening region of the cavity 21 is large, in the loading step, a bridge or a void of the permanent magnet material 53 which could be caused when the permanent magnet material 53 is loaded into the cavity 21 can be prevented.

Further, the depth (indicated by D in FIG. 2) of the cavity 21 is as shallow as about 5 to 25% of the longitudinal length (B) of the cavity 21. Therefore, the permanent magnet material 53 can be loaded with a uniform loading density without a bottom portion of the loaded permanent magnet material 53 being consolidated by self-weight.

Further, the second permanent magnet material 653b can be accurately and easily placed in the corner portion 51 region of the permanent magnet 50 where a high coercivity is required.

Next, as shown in FIG. 15(d), the lid portion 23 is placed so as to lid the cavity 21, whereby the cavity 21 is closed. Along with this, the molding portion 27 of the lid portion 23 depresses the permanent magnet material 53 in the cavity 21, whereby the shape of the molding portion 27 is transferred and the permanent magnet material 53 is molded.

The above step of performing processing from the state in FIG. 15(c) to the state in FIG. 15(d) is referred to as a closing step.

Figure 17:
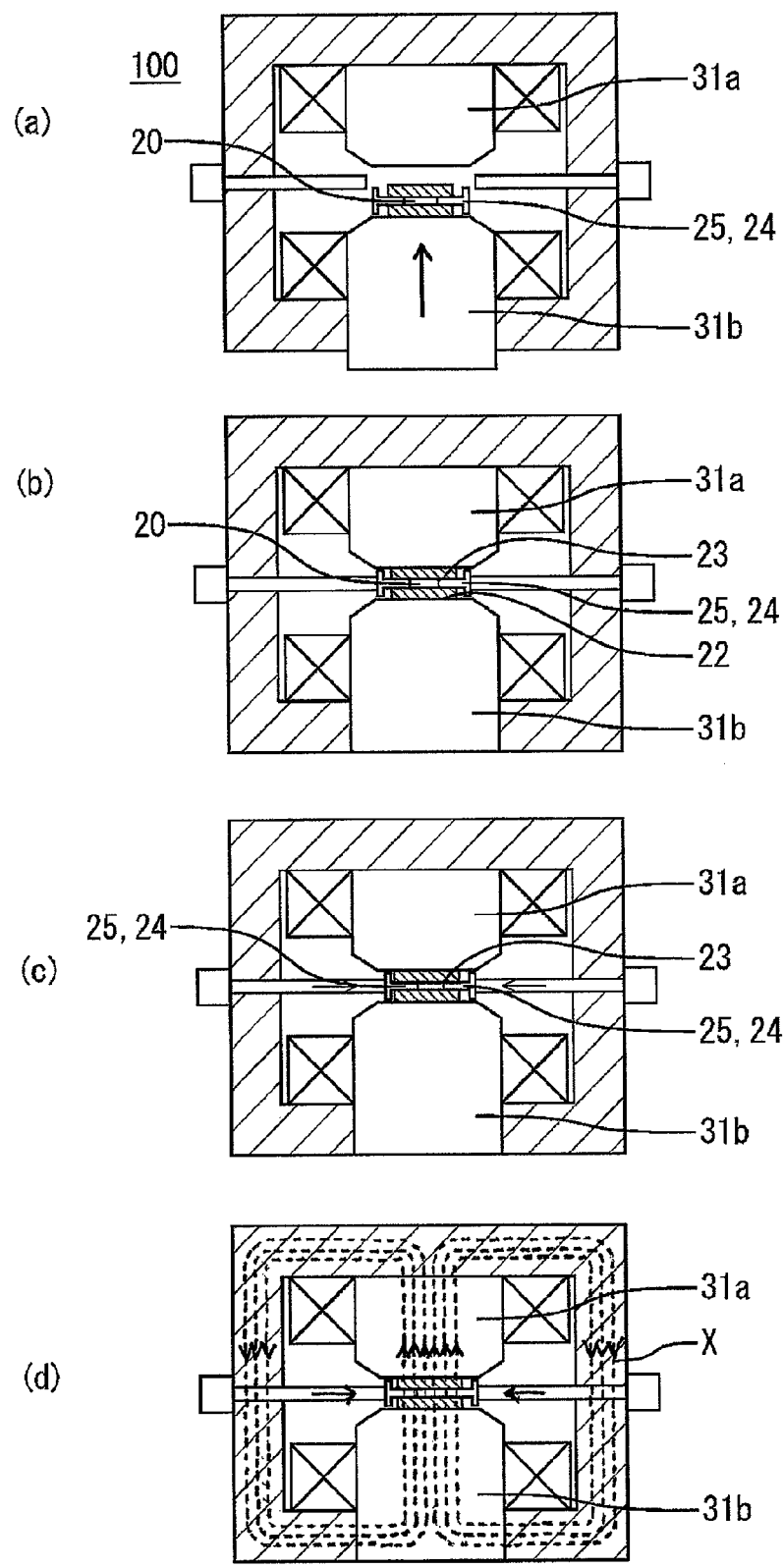
FIG. 17 is a sectional view of the production device for permanent magnet, showing operation of the production device for permanent magnet in which the mold is placed, according to embodiment 7 of the present invention.

FIG. 17 is a sectional view showing the mold 20 for which the above loading step and closing step have been performed, and operation of the device 100 in which the mold 20 is placed.

First, as shown in FIG. 17(a), the pole pieces 31a and 31b opposed to each other are driven upward and downward to be separated from each other so that the gap between the pole pieces 31a and 31b is broadened. Then, the mold 20 for which the above closing step has been performed is placed in the gap.

Next, as shown in FIG. 17(b), the pole pieces 31a and 31b are driven upward and downward again to narrow the gap. Thus, the upper pole piece 31a closely contacts the upper surface of the lid portion 23 of the mold 20, and the lower pole piece 31b closely contacts the lower surface of the die 22 of the mold 20.

At this time, the mold 20 is placed such that the longitudinal direction of the cavity 21 is parallel with the pressurizing direction of each pressurizing cylinder (not shown) for driving the punch 24. The cavity 21 is located on a line connecting both pressurizing cylinders.

Thus, the placement of the mold 20 is completed.

Next, as shown in FIG. 17(c), both pressurizing cylinders (not shown) are driven to extend the pistons (not shown). Thus, the pistons press the pressed portions 26 of both punches 24 from both sides, and the pressurizing portions 25 of both punches 24 slide in directions to approach each other in the cavity 21. Then, end surfaces of the pressurizing portions 25 horizontally pressurize the permanent magnet material 53 so as to be opposed to each other via a predetermined interval.

The step of the punches 24 pressurizing the permanent magnet material 53 in the cavity 21 as described above is referred to as a pressurizing step.

At this time, the electromagnets 30a and 30b are not driven, so that a magnetic field is not applied to the permanent magnet material 53 in the cavity 21.

The permanent magnet material 53 is pressurized with a predetermined force by the punches 24. At this time, the loading density represented by "weight of permanent magnet material 53/cavity volume" is 3.0 g/cm^3 or smaller, or more preferably, 2.5 g/cm^3 or smaller and 2.0 g/cm^3 or greater.

In the case where the loading density is high, grains of the permanent magnet material 53 are difficult to move due to friction thereamong when orientation by a magnetic field is performed later. As a result, the orientation degree (residual magnetic flux density of sintered permanent magnet 50/residual magnetic flux density of sintered permanent magnet 50 that has been ideally oriented along magnetic field direction) is deteriorated, whereby magnetic characteristics are deteriorated.

In the case where the loading density is low, e.g., smaller than 2.0 g/cm^3, the permanent magnet material 53 aligned in the magnetic field direction is consolidated while moving, when being pressurized. Therefore, the magnetization direction of the permanent magnet material 53 is disordered, so that the orientation degree after the sintering is reduced.

Next, as shown in FIG. 17(d), the electromagnets 30a and 30b are driven to generate a magnetic field. The magnetic field is applied to the permanent magnet material 53 in the cavity 21 in a direction perpendicular to the longitudinal direction of the cavity 21. Thus, magnetic field orientation is performed so as to align the magnetization easy axis of the permanent magnet material 53.

At this time, while the permanent magnet material 53 is oriented, the permanent magnet material 53 in the cavity 21 is further pressurized with a predetermined pressure by the punches 24. Thus, pressurized molding is performed in the magnetic field.

The step of performing magnetic field orientation by applying a magnetic field as described above is referred to as an orientation step.

In the present embodiment, as described above, a molding method in which the orientation step and the pressurizing step are combined is performed.

Next, the driving of the electromagnets 30a and 30b is stopped. Thereafter, a magnetic field in which N pole and S pole are reversed is further applied to perform demagnetization. Thereafter, the pistons of both pressurizing cylinders are contracted to be separated from the mold 20.

In the above, as the pressurized molding in a magnetic field, a fixed-pressure molding method is shown in which pressurization is completed when a predetermined pressure is reached. Alternatively, a fixed-position molding method may be used in which pressurization is completed when the pressed portions 26 of both punches 24 are pushed to a predetermined position.

At this time, it is desirable that the density represented by weight of molded body of permanent magnet 50/volume of molded body of permanent magnet 50 is 4 to 4.5 g/cm^3.

Next, although not shown, after the pressurized molding, the pole pieces 31a and 31b are driven upward and downward to be separated from the mold 20. Then, the mold 20 is removed from the gap between the pole pieces 31a and 31b.

Next, although not shown, the lid portion 23 of the mold 20 is detached, and then the molded body of the permanent magnet 50 is detached from the cavity 21.

Finally, although not shown, in vacuum or in an inert gas atmosphere, the molded body of the permanent magnet 50 is thermally processed at about 1000 to 1100° C. Thus, the permanent magnet 50 is contracted to be densified to about 7.5 g/cm^3.

Since the alcohol solvent in the second permanent magnet material 653b is a volatile component, the alcohol solvent gradually vaporizes through the above steps. Even if the alcohol solvent is left, the alcohol solvent is fully vaporized and removed by the above thermal processing, so that only the heavy rare earth element 654 is left in the first permanent magnet material 653a.

Further, by the thermal processing, the heavy rare earth element 654 such as Dy or Tb is distributed so as to surround an Nd—Fe—B based compound crystal of the first permanent magnet material 653a. Therefore, reduction in the residual magnetic flux density can be suppressed and the coercivity can be increased.

This step is referred to as a sintering step.

With the above steps, the process for producing the permanent magnet 50 is finished.

The permanent magnet 50 thus molded has a structure in which the content rate of heavy rare earth element 654 such as Dy or Tb is high in the corner portion 51 region where a high coercivity is needed because a demagnetization field from the stator 42 is particularly strongly applied, and the content rate of heavy rare earth element 654 is low or the heavy rare earth element 654 is not contained in the other region.

Thus, the permanent magnet 50 in which the content rate of heavy rare earth element 654 is partially high can be obtained.

Figure 18:
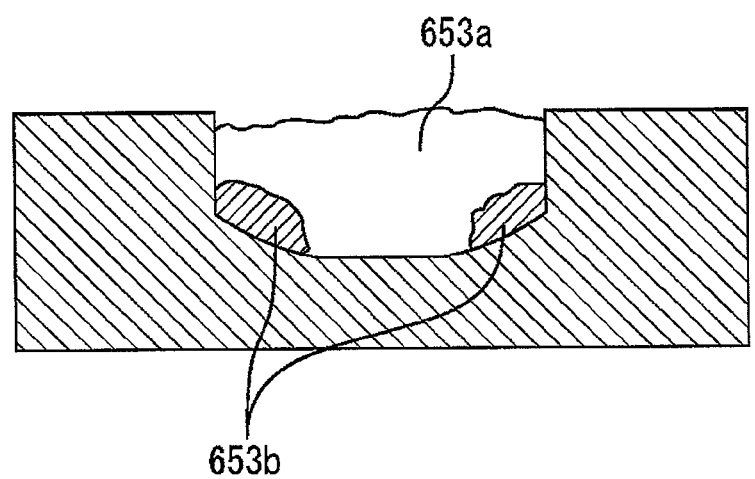
FIG. 18 is a sectional view showing another example of the shape of the mold according to embodiment 7 of the present invention.

FIG. 18 is a sectional view of the cavity 21 along the short-side direction, showing another example of the shape of the mold 20.

In the above, the order of steps is such that the second permanent magnet material 653b is loaded after the first permanent magnet material 653a is loaded. Alternatively, the first permanent magnet material 653a may be loaded after the second permanent magnet material 653b is loaded.

In this case, a liquid adhesion force and a surface tension of the second permanent magnet material 653b provide an effect for the second permanent magnet material 653b to penetrate into gaps among powder grains of the first permanent magnet material 653a placed thereon.

In the case where the order of the first loading step and the second loading step is thus reversed, the shape of the bottom surface of the cavity 21 may be formed so as to correspond to the shape of the circumferential surface of the permanent magnet 50. For example, as shown in FIG. 18, the shape of the bottom surface of the cavity 21 may be a semicylindrical shape.

In the present embodiment, a region in which a large amount of heavy rare earth element 654 is contained is the corner portions 51 (both ends) of the circumferential surface J of the permanent magnet 50. However, such a region may be located only at one corner portion 51 (end) of the circumferential surface J.

In the production method for permanent magnet, the production device for permanent magnet, the permanent magnet and the rotating electrical device using the permanent magnet configured as described above according to the present embodiment, the cavity 21 in which the permanent magnet material 53 is loaded is formed in a groove shape such that the longitudinal direction of the cavity 21 extends in the horizontal direction of the device 100, and the first permanent magnet material 653a and the second permanent magnet material 653b are loaded into this cavity 21. Therefore, a bridge, a void, or the like in the cavity 21 which could be caused when the first permanent magnet material 653a and the second permanent magnet material 653b are loaded therein can be prevented.

Particularly, the heavy rare earth element 654 can be accurately and easily contained in the first permanent magnet material 653a in the corner portion 51 region of the permanent magnet 50 where a high coercivity is required.

Thus, it becomes possible to provide a production method for permanent magnet, a production device for permanent magnet, a permanent magnet and a rotating electrical device using a permanent magnet so that the permanent magnet has an improved coercivity and an improved residual magnetic flux density and the use amount of a heavy rare earth element therein is reduced.

In addition, since the second permanent magnet material 653b in a slurry state is loaded on the first permanent magnet material 653a whose powder density is sparse, the heavy rare earth element 654 can be caused to penetrate to a desired depth in a short time.

Thus, a time taken for penetration of the heavy rare earth element 654 can be shortened, whereby the productivity can be improved.

In addition, since a long period of thermal processing for penetration of the heavy rare earth element 654 is not needed, diffusion of the heavy rare earth element 654 into a crystal grain of the permanent magnet 50 can be suppressed, and therefore reduction in the residual magnetic flux density can be prevented.

In the case where the permanent magnet 50 is formed in a shape obtained by, for example, combining a cuboid portion and a semicylindrical portion, in a sectional area of the permanent magnet 50 cut along a plane perpendicular to the central shaft of the rotor 41, an area corresponding to both end portions of the circumferential surface of the permanent magnet 50, where a particularly strong demagnetization field from the stator 42 is applied of a demagnetization field applied in parallel with the orientation direction of the permanent magnet 50, is 4 to 30% of the sectional area of the permanent magnet 50 which is defined as 100%. The sectional area of one end portion of the permanent magnet 50 where a particularly strong demagnetization field is applied is as very small as 2 to 15%.

According to the present invention, the heavy rare earth element 654 can be accurately placed even in a region having such a small sectional area and a thin shape extending in the longitudinal direction of the permanent magnet 50.

It is noted that a demagnetization field applied to the region other than the above 4 to 30% areas of both ends of the circumferential surface of the permanent magnet 50 is small, and therefore has little influence on the coercivity.

Further, since the depth of the cavity 21 is shallow, occurrence of a density difference due to the permanent magnet material 53 being densified by self-weight before orientation can be prevented.

Therefore, in the permanent magnet 50, reduction in the orientation degree due to the density difference does not occur, and since contraction that uniforms the density difference after sintering can be suppressed, shape distortion is reduced.

As a result, in the permanent magnet 50, a cutting margin in mechanical work for shape finishing can be reduced. Further, the mechanical work for shape finishing can be even omitted.

Therefore, in the permanent magnet 50, the use amount of the heavy rare earth element 654 can be further reduced, and the cost of mechanical work can be also reduced.

Instead of using a method of separately molding and sintering a permanent magnet material containing a large amount of heavy rare earth element and a permanent magnet material containing no heavy rare earth element using different molds, the present invention uses a method of molding and sintering the first permanent magnet material 653a and the second permanent magnet material 653b in the same mold 20.

Thus, pressurizing forces (molding pressures) applied to the first permanent magnet material 653a and the second permanent magnet material 653b are almost uniformed, so that occurrence of density difference or the like in sintering can be prevented.

In addition, since the number of steps is the same as in the case of molding and sintering one kind of permanent magnet material, the process is not complicated and an effect of productivity improvement and production cost reduction can be obtained.

Further, not only in the case where the permanent magnet 50 is desired to have a simple shape such as plate-like sectional shape (rectangular sectional shape) but also in the case where the permanent magnet 50 is desired to have a complicated shape such as a shape obtained by combining a cuboid portion and a semicylindrical portion or an arc-plate sectional shape, the content rate of heavy rare earth element 654 can be selectively enhanced, at both end portions in the width direction of the permanent magnet 50 which corresponds to the rotation direction when the permanent magnet 50 is attached to the rotor 41, in the permanent magnet 50 surface facing the stator 42, and the vicinity thereof.

Since the above method does not use a partition or the like for dividing the cavity 21 in molding, distortion, crack, fracture, or the like can be prevented from occurring at the interface between a region in which a large amount of heavy rare earth element 654 is contained and a region in which no or a slight amount of heavy rare earth element 654 is contained, of the permanent magnet 50.

In a conventional production device, since a mold is integrally incorporated in the device, operations of "when a permanent magnet is molded, taking out the permanent magnet from the mold, and then loading a permanent magnet material into a vacant cavity" are alternately repeated, whereby molded products of permanent magnets are sequentially produced. Therefore, while a permanent magnet material is being loaded into the mold, orientation and press working operation need to be interrupted, so that the productivity reduces.

However, in the present invention, the mold 20 is detachable from the device 100. Therefore, while the permanent magnet material 53 is being loaded into the mold 20, the permanent magnet 50 can be molded by another mold 20, whereby the productivity is improved as compared to a conventional permanent magnet device.

The loading step is performed with the mold 20 separated from the device 100. Therefore, a loading mechanism portion needed for the loading work can be provided without space restriction. Therefore, unevenness of the loading density in the cavity 21 can be suppressed, and the loading density in the horizontal direction of the permanent magnet material 53 in the cavity 21 can be further uniformed.

In the case where a rare earth element is adhered to a sintered body of a permanent magnet by application, deposition, sputtering, or the like, it is necessary to perform this adhering step, a step of masking the sintered body of the permanent magnet, a step of performing special thermal processing for promoting penetration of the rare earth element, and the like. However, the present invention does not need these steps, and therefore an effect of further productivity improvement and production cost reduction is obtained.

In addition, the heavy rare earth element 654 can be prevented from adhering to a fixture for masking, a wall surface of a processing chamber for sputtering the heavy rare earth element 654, or the like. Therefore, the heavy rare earth element 654 is not wasted, and the use amount of the heavy rare earth element 654 can be sufficiently reduced.

With use of the same mold, by adjusting the loading amount of the heavy rare earth element 654 such as Dy or Tb, permanent magnets having various distributions of heavy rare earth element can be easily produced, and in addition, since the permanent magnet 50 can be produced on a piece-by-piece basis, various-kind and various-amount production can be easily performed.

The loading step does not need to be performed at a place where a magnetic field is applied. Therefore, the loading step can be prevented from being disturbed by the permanent magnet material 53 being adhered to the mold 20 due to magnetization remaining in the mold 20 or ferromagnetic members such as the pole pieces 31a and 31b. In addition, variation in the loading amount of the permanent magnet material 53 in the mold 20 due to magnetization, and variation in the magnetic characteristics of the permanent magnet 50 due to unevenness of the loading density, can be prevented.

The mold 20 is formed by a nonmagnetic member, so that magnetization by a magnetic field does not remain. Therefore, the permanent magnet material 53 can be further prevented from being adhered to the mold 20 when the permanent magnet material 53 is loaded.

A ferromagnetic mechanism portion such as the pole pieces 31a and 31b does not exist around the cavity 21 in loading work. Therefore, the permanent magnet material 53 can be prevented from being adhered to the pole pieces 31a and 31b or the like. Thus, the use amount of a heavy rare earth element can be reduced to a minimum necessary amount.

In the above embodiment 7, an example in which, after the second loading step, the slurry second permanent magnet material 653b naturally penetrates into the first permanent magnet material 653a, has been shown. Alternatively, a second swing step for swinging the cavity 21 may be performed after the second loading step. This second swing step can further promote penetration of the second permanent magnet material 653b into the first permanent magnet material 653a. Therefore, penetration of the second permanent magnet material 653b can be performed in a further short time, whereby the production efficiency can be improved.

Embodiment 8

Hereinafter, with reference to the drawings, embodiment 8 of the present invention will be described focusing on a part different from embodiment 7.

Figure 19:
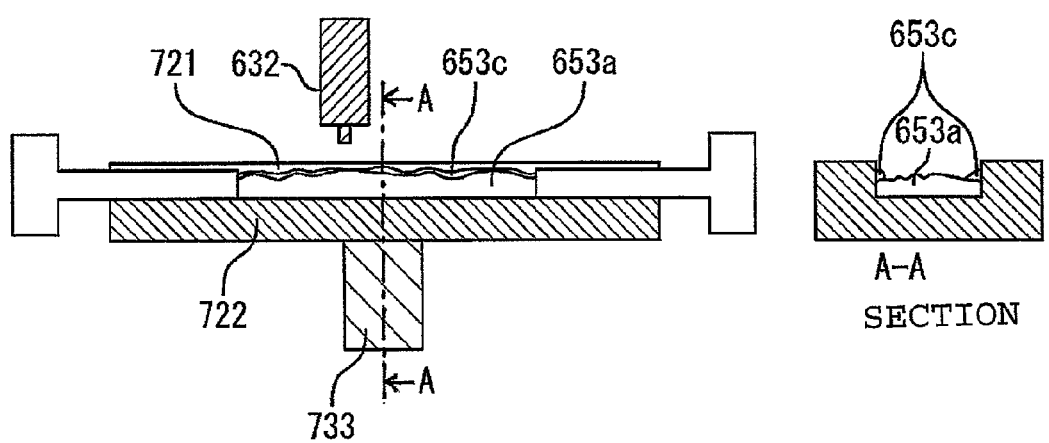
FIG. 19 is a sectional view of a production device for permanent magnet, showing a process for loading a permanent magnet material in the production device for permanent magnet, according to embodiment 8 of the present invention.

FIG. 19 is sectional views of a cavity 721 along the longitudinal direction and the short-side direction, showing a process for loading the first permanent magnet material 653a and a third permanent magnet material 653c into the cavity 721 formed by the mold 20.

In the drawings used in the present embodiment, the same components as in the above embodiment 7 are denoted by the same reference characters, and the description thereof is omitted.

In the present embodiment, a swing portion 733 capable of swinging a die 722 is provided.

The swing portion 733 is capable of swinging the die 722 in both of the longitudinal direction and the short-side direction of the cavity 721, and further capable of adjusting a time of swinging and the magnitude of swing.

In the present embodiment, the third permanent magnet material 653c is used in place of the slurry second permanent magnet material 653b of embodiment 7.

A method for producing the permanent magnet 50 using the swing portion 733 will be described.

First, as the permanent magnet material 53, the first permanent magnet material 653a is prepared as in embodiment 7, and further, as the permanent magnet material 53, the third permanent magnet material 653c is prepared by powdering the heavy rare earth element 654 such as Dy or Tb.

Next, as in embodiment 7, in the first loading step (FIG. 15(b)), the first permanent magnet material 653a is loaded into the cavity 21.

Next, as shown in FIG. 19, the third permanent magnet material 653c is loaded into the cavity 21. This step is the same as the second loading step (FIG. 15(c)) of embodiment 7 except that the second permanent magnet material 653b is replaced with the third permanent magnet material 653c.

Next, the cavity 721 is swung using the swing portion 733.

Here, since the first permanent magnet material 653a has not been pressurized or sintered yet, the powder density thereof is sparse so that there are gaps among the powder grains, and the third permanent magnet material 653c is made of a powder of the heavy rare earth element 654. Therefore, when the cavity 21 is thus swung, the powder of the heavy rare earth element 654 which has a great specific gravity enters gaps among the powder grains of the first permanent magnet material 653a through vibration of the cavity 21, and thus moves toward the bottom of the cavity 21, to become a state shown in FIG. 16.

The above step is referred to as a first swing step.

Thereafter, the steps described in embodiment 7 are performed to produce the permanent magnet 50.

Thus, the third permanent magnet material 653c forming the corner portion 51 contains a larger amount of heavy rare earth element 654 than in the other region of the permanent magnet 50.

Here, the heavy rare earth element 654 in the third permanent magnet material 653c is diffused toward the bottom of the cavity 21 while being interposed among the powder grains of the first permanent magnet material 653a.

Thus, from the opening side to the bottom side of the cavity 721, the content rate of heavy rare earth element 654 decreases.

In the permanent magnet 50, a part where a high coercivity is needed because a demagnetization field from the stator is particularly strongly applied is the vicinity of the surface of the permanent magnet 50, and an influence of the demagnetization field becomes weaker at a deeper part. Thus, a distribution of the heavy rare earth element 654 is appropriate to the magnitude of the influence of the demagnetization field.

The production method for permanent magnet, the production device for permanent magnet, the permanent magnet and the rotating electrical device using the permanent magnet configured as described above according to the present embodiment provide the following effect, as well as the same effect as in the above embodiment 7. That is, since the third permanent magnet material 653c having a sparse powder density is loaded on the first permanent magnet material 653a also having a sparse powder density, and then they are swung, the diffusion speed of the heavy rare earth element 654 is fast, and the heavy rare earth element 654 can be diffused to a desired depth in a short time.

Thus, an effect of productivity improvement and production cost reduction can be obtained.

In addition, by adjusting a time of swinging and the magnitude of swing of the swing portion 733, permanent magnets having various distributions of heavy rare earth element 654 can be easily produced. In addition, since the permanent magnet 50 can be produced on a piece-by-piece basis, various-kind and various-amount production can be easily performed.

Embodiment 9

Hereinafter, with reference to the drawings, embodiment 9 of the present invention will be described focusing on a part different from embodiments 7 and 8.

In the drawings used in the present embodiment, the same components as in the above embodiments 7 and 8 are denoted by the same reference characters, and the description thereof is omitted.

Figure 20:
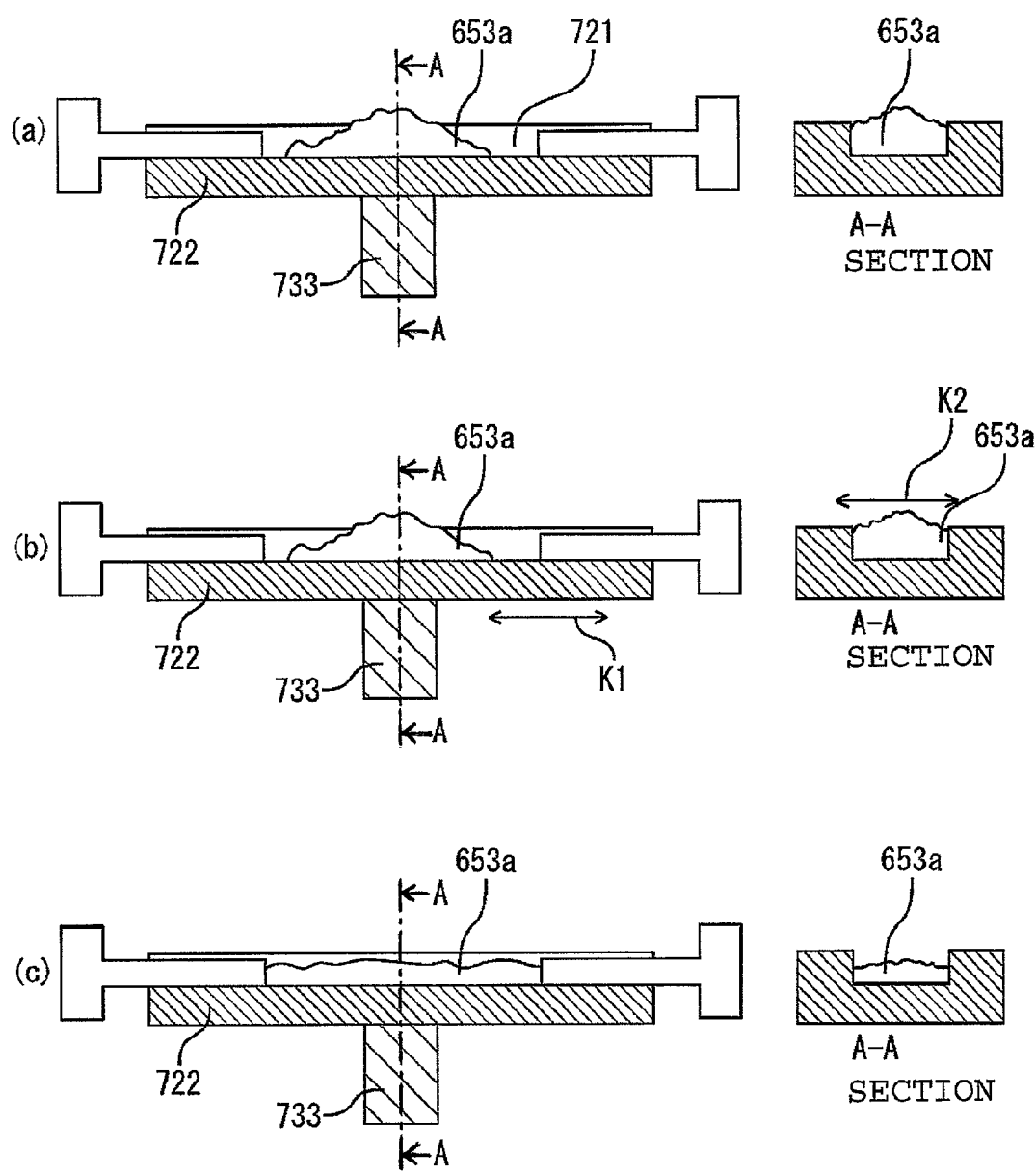
FIG. 20 is a sectional view of a production device for permanent magnet, showing a mold and a permanent magnet material in a cavity, according to embodiment 9 of the present invention.

FIG. 20 is sectional views of the cavity 21 along the longitudinal direction and the short-side direction, showing the mold 20 and the permanent magnet material 53 in the cavity 21 in the present embodiment.

In the present embodiment, the same swing portion 733 as in embodiment 8 is provided.

A process for loading a permanent magnet material using the swing portion 733 will be described.

First, as shown in FIG. 20(a), the first loading step is performed as in embodiment 7, to load the first permanent magnet material 653a into the cavity 21.

At this time, as shown in FIG. 20(a), the first permanent magnet material 653a is loaded in a mountain-like shape so as to be heaped upward partially in the cavity 721.

Next, as shown in FIG. 20(b), the die 722 is swung by the swing portion.

By swing K1 of the die 722 in the longitudinal direction of the cavity 721, the first permanent magnet material 653a in a state shown in the left diagram of FIG. 20(b) is flattened in the longitudinal direction of the cavity 721 as shown in the left diagram of FIG. 20(c).

In addition, by swing K2 of the die 722 in the short-side direction of the cavity 21, the first permanent magnet material 653a in a state shown in the right diagram of FIG. 20(b) is flattened in the short-side direction of the cavity 721 as shown in the right diagram of FIG. 20(c).

Although not shown, for example, after the second permanent magnet material 653b or the third permanent magnet material 653c is loaded, the die 722 may be swung only in the longitudinal direction of the cavity 721, whereby the second permanent magnet material 653b or the third permanent magnet material 653c may be placed so as to extend along the longitudinal inner wall of the cavity 721.

In addition, if the cavity 721 is thus swung, the powder of the heavy rare earth element 654 which has a great specific gravity enters gaps among the powder grains of the first permanent magnet material 653a through vibration of the cavity 721, and thus the diffusion speed of the heavy rare earth element 654 can be promoted.

The above step from the state in FIG. 20(b) to the state in FIG. 20(c) is referred to as a second swing step.

The production method for permanent magnet, the production device for permanent magnet, the permanent magnet and the rotating electrical device using the permanent magnet configured as described above according to the present embodiment provides the same effects as in the above embodiments 7 and 8. Further, it becomes possible to load the permanent magnet material 53 uniformly throughout the cavity 721 by swinging the die 722 even if the permanent magnet material 53 has not been uniformly loaded in the cavity 721 in the loading step.

Thus, it becomes possible to provide a production method for permanent magnet, a production device for permanent magnet, a permanent magnet and a rotating electrical device using a permanent magnet so that the permanent magnet has a further improved balance between the coercivity and the residual magnetic flux density and the use amount of a heavy rare earth element therein is further reduced.

Embodiment 10

Hereinafter, with reference to the drawings, embodiment 10 of the present invention will be described focusing on a part different from embodiment 7.

In the drawings used in the present embodiment, the same components as in the above embodiment 7 are denoted by the same reference characters, and the description thereof is omitted.

Figure 21:
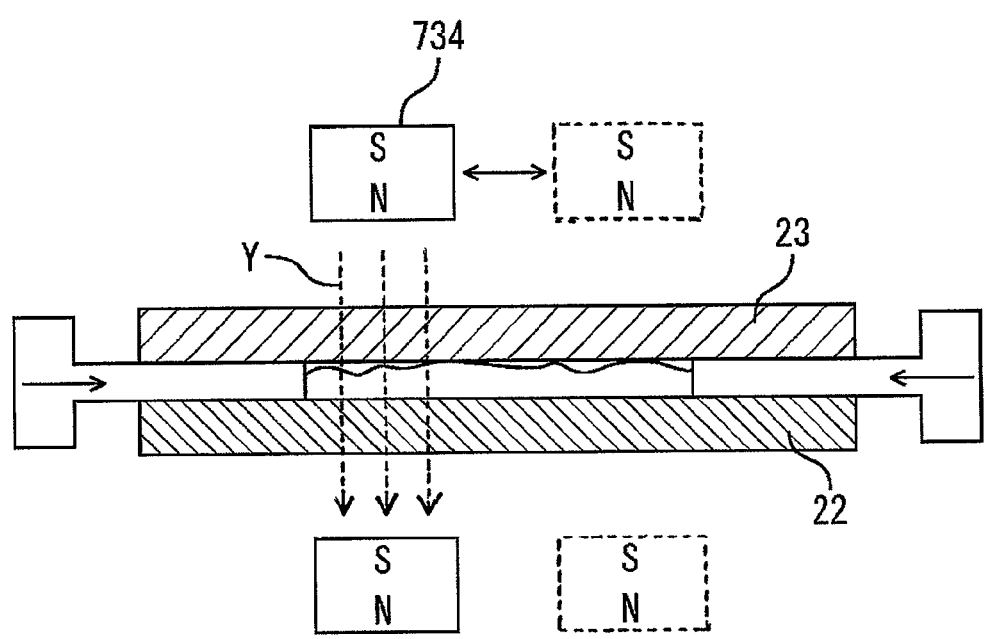
FIG. 21 is a sectional view of a production device for permanent magnet, showing a mold and a magnet, according to embodiment 10 of the present invention.

FIG. 21 is a sectional view showing the cavity 21 and magnets 734 in the present embodiment.

In the present embodiment, the magnets 734 movable in the horizontal direction are provided above and below the cavity 21.

The magnet 734 is a ferrite magnet, an SmCo (samarium-cobalt) magnet, an Nd—Fe—B based magnet, or the like having a smaller size than that of the cavity 21.

Hereinafter, a production method for permanent magnet using the magnet 734 will be described.

First, as in embodiment 7, the first permanent magnet material 653a is loaded into the cavity 21 in the first loading step (FIG. 15(b)).

Next, as in embodiment 7, the cavity 21 is closed in the closing step (FIG. 15(d)).

Next, before the second loading step (FIG. 15(c)) is performed, as shown in FIG. 20, the magnet 734 is located close to the upper surface of the lid portion 23 or the lower surface of the die 22. In this state, a weak magnetic field Y indicated by a dot line is applied to the permanent magnet material 53 in a region smaller than the size of the cavity 21. Then, the magnetic field is moved while the magnet 734 is swung in the horizontal direction.

Thus, the permanent magnet material 53 can be agitated and loaded uniformly.

The above step is referred to as a magnetic field agitation step.

Further, if the pressurizing step described in embodiment 7 and the second swing step described in embodiment 9 are combined with the magnetic field agitation step of the present embodiment, the permanent magnet material 53 can be loaded further uniformly.

In this case, in the state in which the magnet 734 is located close to the upper surface of the lid portion 23 or the lower surface of the die 22, while the die 22 is swung in the horizontal direction in the second swing step, a weak magnetic field is applied to the permanent magnet material 53 in a region smaller than the size of the cavity 21, whereby the permanent magnet material 53 is agitated.

Further, in the pressurizing step, the pressurizing portions 25 of both punches 24 are moved to approach each other, and while the inside of the cavity 21 is thus gradually narrowed, the above magnetic field agitation step is performed, whereby the loading can be performed further uniformly.

In the pressurizing step, it is preferable to adjust the positions of both punches 24 so that the value of "mass of loaded permanent magnet material 53/cavity volume" is within a range of 2.0 to 3.0 g/cm^3.

The production method for permanent magnet, the production device for permanent magnet, the permanent magnet and the rotating electrical device using the permanent magnet configured as described above according to the present embodiment provide the same effect as in the above embodiment 7. Further, a weak magnetic field is applied to the cavity 21 and the magnetic field is moved to agitate the permanent magnet material 53 in the cavity 21, thereby loading the permanent magnet material 53 uniformly throughout the cavity 21.

Thus, it becomes possible to provide a production method for permanent magnet, a production device for permanent magnet, a permanent magnet and a rotating electrical device using a permanent magnet so that the permanent magnet has a further improved balance between the coercivity and the residual magnetic flux density and the use amount of a rare earth element therein is further reduced.

Embodiment 11

Hereinafter, embodiment 11 of the present invention will be described focusing on a part different from embodiment 7.

The same components as in the above embodiment 7 are denoted by the same reference characters, and the description thereof is omitted.

In the present embodiment, the nonmagnetic rod portion 600 is provided.

Hereinafter, a production method for permanent magnet using the rod portion will be described.

After the first loading step (FIG. 15(*b*)) in embodiment 7 is performed and before the second loading step (FIG. 15(*c*)) is performed, the nonmagnetic rod portion 600 is inserted into the cavity 21, and the permanent magnet material 53 in the cavity 21 is agitated by the rod portion 600.

This step is referred to as a rod agitation step.

Thus, the permanent magnet material 53 can be uniformly loaded into the cavity 21.

The production method for permanent magnet, the production device for permanent magnet, the permanent magnet and the rotating electrical device using the permanent magnet configured as described above according to the present embodiment, as well as providing the same effect as in the above embodiment 7, agitate the permanent magnet material 53 in the cavity 21 by the rod portion, thereby loading the permanent magnet material 53 uniformly throughout the cavity 21.

Thus, it becomes possible to provide a production method for permanent magnet, a production device for permanent magnet, a permanent magnet and a rotating electrical device using a permanent magnet so that the permanent magnet has a further improved balance between the coercivity and the residual magnetic flux density and the use amount of a rare earth element therein is further reduced.

In addition, since the rod portion 600 is nonmagnetic, the permanent magnet material 53 can be prevented from being adhered to the rod portion, whereby the use amount of a rare earth element can be reduced.

It is noted that, within the scope of the present invention, the above embodiments may be freely combined with each other, or each of the above embodiments may be modified or abbreviated as appropriate.

The invention claimed is:

1. A production method for a permanent magnet, comprising:
    a loading step of loading a magnetic powder into a cavity formed by a mold; and
    a pressurizing step of pressurizing the magnetic powder in the cavity, thereby compressing and molding the magnetic powder, wherein
    the cavity is formed in a groove shape such that a longitudinal direction of the cavity extends in a horizontal direction, and
    the loading step includes
        a first loading step of loading a first magnetic powder of the magnetic powder,
        a second loading step of loading, of the magnetic powder, a second magnetic powder at a predetermined position in the cavity, a content rate of the heavy rare earth element in the second magnetic powder being higher than that in the first magnetic powder,
        a first closing step of, before the pressurizing step and after the first loading step, closing the cavity with a first lid portion which has a preliminary molding portion with a protrusion formed at the predetermined position at a cavity side, and depressing the first magnetic powder in the cavity by the preliminary molding portion, thereby transferring a shape of the preliminary molding portion and molding the first magnetic powder in which a dent is formed at the predetermined position, and
        a second closing step of, after the second loading step, closing the cavity with a second lid portion which has a molding portion at the cavity side, and depressing the magnetic powder in the cavity by the molding portion, thereby transferring a shape of the molding portion and molding the magnetic powder.

2. The production method for a permanent magnet according to claim 1, wherein
    the second magnetic powder includes a plural kinds of the second magnetic powders having different content rates of the heavy rare earth element, and
    in the second loading step, the second magnetic powders are loaded into the cavity, in order from the lowest content rate of the heavy rare earth element.

3. The production method for a permanent magnet according to claim 1, wherein the predetermined position is a position extending along a longitudinal inner wall of the cavity.

4. The production method for a permanent magnet according to claim 1, further comprising a magnetic field agitation step of applying a magnetic field in a direction perpendicular to the horizontal direction of the cavity, to the magnetic powder loaded in the cavity, thereby agitating the magnetic powder.

5. The production method for a permanent magnet according to claim 1, further comprising a rod agitation step of agitating the magnetic powder loaded in the cavity, by a nonmagnetic rod portion, so that the magnetic powder is uniformly loaded.

6. The production method for a permanent magnet according to claim 1, further comprising a swing step of swinging the magnetic powder loaded in the cavity.

7. The production method for a permanent magnet according to claim 1, further comprising an orientation step of applying a magnetic field in a direction perpendicular to the horizontal direction of the cavity, to the magnetic powder loaded in the cavity, thereby orienting the magnetic powder.

8. The production method for a permanent magnet according to claim 1, further comprising a sintering step of sintering the magnetic powder loaded in the cavity, after the pressurizing step.

9. A production device for a permanent magnet, in which a magnetic powder is loaded into a cavity formed in a mold and the magnetic powder in the cavity is pressurized, whereby the magnetic powder is compressed and molded, comprising:
- a mold including a cavity wherein the cavity is formed in a groove shape such that a longitudinal direction of the cavity extends in a horizontal direction;
- a first lid portion provided above the cavity and configured to close the cavity with the magnetic powder loaded therein, the first lid portion having a preliminary molding portion with a protrusion formed at a predetermined position at a cavity side wherein
the preliminary molding portion is configured to, by depressing the magnetic powder in the cavity with the preliminary molding portion from above, transfer a shape of the preliminary molding portion and mold the magnetic powder in which a dent recessed downward is formed at the predetermined position on the upper surface of the magnetic powder; and
- a second lid portion provided above the cavity and configured to close the cavity with the magnetic powder loaded therein after the first lid portion has formed the dent at the predetermined position, the second lid portion having a molding portion at the cavity side, wherein
the molding portion is configured to, by depressing the magnetic powder in the cavity with the molding portion from above, transfer a shape of the molding portion and mold the magnetic powder.

10. The production device for a permanent magnet according to claim 9, wherein the protrusion is formed at a position extending along a longitudinal inner wall of the cavity.

11. The production device for a permanent magnet according to claim 9, further comprising:
- a magnetic field generating portion for generating a magnetic field in a direction perpendicular to a longitudinal direction of the cavity, the magnetic field generating portion composed of a pair of electromagnets placed above and below the cavity so as to be opposed to each other.

12. The production device for a permanent magnet according to claim 9, wherein the mold is detachable from the production device.

* * * * *